United States Patent
Dewitt et al.

(10) Patent No.: US 11,710,128 B2
(45) Date of Patent: Jul. 25, 2023

(54) MOBILE DEVICE BASED IDENTITY VERIFICATION

(71) Applicant: MX Technologies, Inc., Lehi, UT (US)

(72) Inventors: Brandon Dewitt, Provo, UT (US);
John Ryan Caldwell, Lehi, UT (US);
Ryan McBride, Lehi, UT (US);
William Nathan Caldwell, Lehi, UT (US)

(73) Assignee: MX TECHNOLOGIES, INC., Lehi, UT (US)

( * ) Notice: Subject to any disclaimer, the term of this patent is extended or adjusted under 35 U.S.C. 154(b) by 0 days.

(21) Appl. No.: 16/161,019

(22) Filed: Oct. 15, 2018

(65) Prior Publication Data

US 2019/0114643 A1    Apr. 18, 2019

Related U.S. Application Data

(60) Provisional application No. 62/572,107, filed on Oct. 13, 2017.

(51) Int. Cl.
*G06Q 20/40* (2012.01)
*G06Q 30/0207* (2023.01)
*G06Q 20/38* (2012.01)
*G06Q 20/32* (2012.01)

(52) U.S. Cl.
CPC ... *G06Q 20/40145* (2013.01); *G06Q 20/3224* (2013.01); *G06Q 20/3226* (2013.01); *G06Q 20/3821* (2013.01); *G06Q 30/0222* (2013.01)

(58) Field of Classification Search
CPC ......... G06Q 20/40145; G06Q 20/3224; G06Q 20/3226; G06Q 20/3821; G06Q 30/0222
See application file for complete search history.

(56) References Cited

U.S. PATENT DOCUMENTS

| | | | | |
|---|---|---|---|---|
| 7,606,915 B1* | 10/2009 | Calinov | ................. | G06F 21/36 |
| | | | | 709/229 |
| 2010/0114734 A1* | 5/2010 | Giuli | ..................... | G06Q 20/32 |
| | | | | 705/26.1 |
| 2011/0154459 A1* | 6/2011 | Kuang | .................. | G06F 21/577 |
| | | | | 726/6 |
| 2014/0007247 A1* | 1/2014 | Carter | ................... | H04L 51/212 |
| | | | | 726/26 |
| 2014/0164256 A1* | 6/2014 | Booij | .................. | H04M 3/5183 |
| | | | | 705/304 |

(Continued)

OTHER PUBLICATIONS

Mobile Identity Authentication (Year: 2017).*

(Continued)

*Primary Examiner* — David P Sharvin
*Assistant Examiner* — Brock E Turk
(74) *Attorney, Agent, or Firm* — Kunzler Bean & Adamson

(57) ABSTRACT

Apparatuses, systems, methods, and computer program products are presented for mobile device based identity verification. An apparatus includes a data module configured to receive sensor data from a hardware device associated with a user. An apparatus includes a transaction module configured to receive transaction data associated with a transaction. An apparatus includes a verification module configured to verify an identity of a user making a transaction based on received sensor data. A transaction may be allowed in response to verifying a user's identity.

11 Claims, 16 Drawing Sheets

(56) References Cited

U.S. PATENT DOCUMENTS

| | | | | |
|---|---|---|---|---|
| 2014/0207680 | A1* | 7/2014 | Rephlo | H04B 5/0062 |
| | | | | 705/44 |
| 2015/0032621 | A1* | 1/2015 | Kar | G06Q 20/4016 |
| | | | | 705/44 |
| 2015/0150104 | A1* | 5/2015 | Melzer | G06N 20/00 |
| | | | | 726/7 |
| 2015/0205957 | A1* | 7/2015 | Turgeman | G06F 21/554 |
| | | | | 726/23 |
| 2015/0347999 | A1* | 12/2015 | Lau | G06Q 20/32 |
| | | | | 705/18 |
| 2016/0132851 | A1* | 5/2016 | Desai | G06Q 20/202 |
| | | | | 705/21 |
| 2016/0212126 | A1* | 7/2016 | Sadacharam | H04L 63/0861 |
| 2017/0006008 | A1* | 1/2017 | Moran | H04L 63/08 |
| 2017/0053280 | A1* | 2/2017 | Lishok | G06Q 20/3224 |
| 2017/0177881 | A1* | 6/2017 | Krishna | G06F 21/604 |
| 2017/0331824 | A1* | 11/2017 | Pender | H04L 63/0892 |

OTHER PUBLICATIONS

Roose K., It's Time to Kill the Online Security Question, Intelligencer, https://nymag.com/intelligencer/2014/09/time-to-kill-the-online-security-question.html, Sep. 3, 2014, p. 3 (Year: 2014).*
Zhao, Peng, et al. "Understanding smartphone sensor and app data for enhancing the security of secret questions." IEEE Transactions on Mobile Computing 16.2 (2016): 552-565. (Year: 2016).*
Australian Application No. 2019204323, Examination report No. 1 for standard patent application, dated Apr. 2, 2020, pp. 1-4.
AU Patent Application 2019204323 Examination Report, dated Mar. 24, 2021.
CA Patent Application 3,047,627 Office Action, dated May 6, 2021.

* cited by examiner

MOBILE DEVICE BASED IDENTITY VERIFICATION

CROSS-REFERENCES TO OTHER APPLICATIONS

This application claims the benefit of U.S. Provisional Patent Application No. 62/572,107 entitled "MOBILE DEVICE BASED IDENTITY VERIFICATION" and filed on Oct. 13, 2017, for Brandon Dewitt et al., which is incorporated herein by reference

FIELD

This invention relates to mobile devices and more particularly relates to verification of a user's identity using a mobile device.

BACKGROUND

In the digital era, it is increasingly important to verify a user's identity, in order to avoid fraud or the like. However, a digital identity may also be hacked, spoofed, or otherwise faked.

SUMMARY

Apparatuses are presented for mobile device based identity verification. An apparatus, in one embodiment, includes a data module configured to receive sensor data from a hardware device associated with a user. An apparatus, in certain embodiments, includes a transaction module configured to receive transaction data associated with a transaction. An apparatus, in further embodiments, includes a verification module configured to verify an identity of a user making a transaction based on received sensor data. A transaction may be allowed in response to verifying a user's identity.

Methods are presented for mobile device based identity verification. A method, in one embodiment, includes receiving sensor data from a hardware device associated with a user. A method, in certain embodiments, includes receiving transaction data associated with a transaction. A method, in further embodiments, includes verifying an identity of a user making a transaction based on received sensor data. A transaction may be allowed in response to verifying a user's identity.

Apparatuses are presented for mobile device based identity verification. An apparatus, in one embodiment, includes means for receiving sensor data from a hardware device associated with a user. An apparatus, in certain embodiments, includes means for receiving transaction data associated with a transaction. An apparatus, in further embodiments, includes means for verifying an identity of a user making a transaction based on received sensor data. A transaction may be allowed in response to verifying a user's identity.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
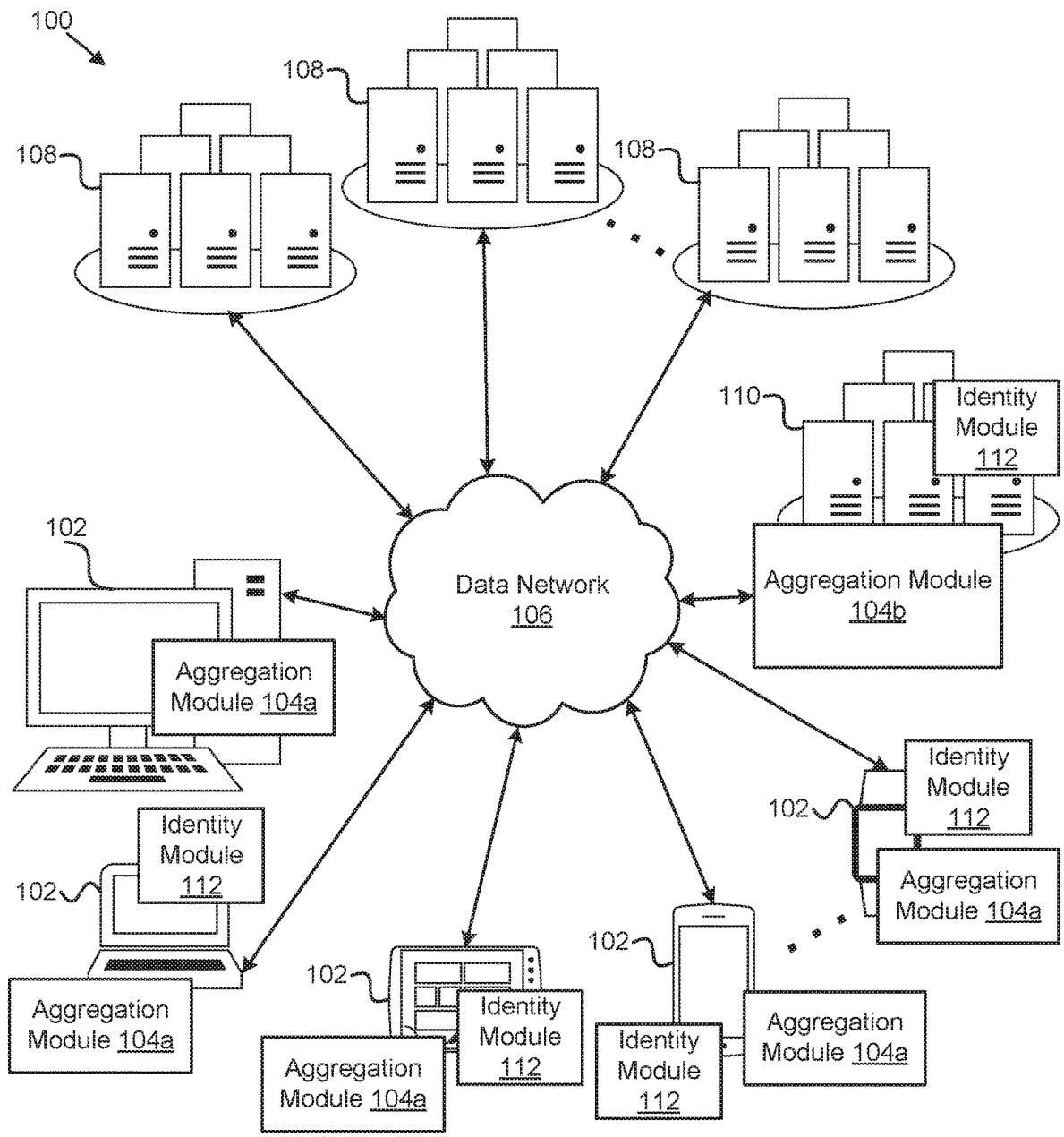
FIG. 1 is a schematic block diagram illustrating one embodiment of a system for mobile device based identity verification.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 depicts one embodiment of a system 100 for mobile device based identity verification. In one embodiment, the system 100 includes one or more hardware devices 102, one or more aggregation modules 104 (e.g., a backend aggregation module 104b and/or a plurality of aggregation modules 104a disposed on the one or more hardware devices 102), one or more data networks 106 or other communication channels, one or more third-party service providers 108 (e.g., one or more servers 108 of one or more service providers 108; one or more cloud or network service providers, or the like), and/or one or more backend servers 110. In certain embodiments, even though a specific number of hardware devices 102, aggregation modules 104, data networks 106, third-party service providers 108, and/or backend servers 110 are depicted in FIG. 1, one of skill in the art will recognize, in light of this disclosure, that any number of hardware devices 102, aggregation modules 104, data networks 106, third-party service providers 108, and/or backend servers 110 may be included in the system 100 for distributed data aggregation.

In one embodiment, the system 100 includes one or more hardware devices 102. The hardware devices 102 (e.g., computing devices, information handling devices, or the like) may include one or more of a desktop computer, a laptop computer, a mobile device, a tablet computer, a smart phone, a set-top box, a gaming console, a smart TV, a smart watch, a fitness band, an optical head-mounted display (e.g., a virtual reality headset, smart glasses, or the like), an HDMI or other electronic display dongle, a personal digital assistant, and/or another computing device comprising a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a volatile memory, and/or a non-volatile storage medium. In certain embodiments, the hardware devices 102 are in communication with one or more servers 108 of one or more third-party service providers 108 and/or one or more backend servers 110 via a data network 106, described below. The hardware devices 102, in a further embodiment, are capable of executing various programs, program code, applications, instructions, functions, or the like.

In one embodiment, an aggregation module 104 is configured to determine and/or receive a user's electronic credentials (e.g., username and password, fingerprint scan, retinal scan, digital certificate, personal identification number (PIN), challenge response, security token, hardware token, software token, DNA sequence, signature, facial recognition, voice pattern recognition, bio-electric signals, two-factor authentication credentials, or the like) for one or more third-party service providers 108. The aggregation module 104, in certain embodiments, accesses a server 108 of a third-party service provider 108 using a user's electronic credentials to download data associated with the user from the server 108, such as a user's photos, a user's social media posts, a user's medical records, a user's financial transaction records or other financial data, and/or other data associated with and/or owned by a user but stored by a server 108 of a third-party service provider 108 (e.g., stored by hardware not owned, maintained, and/or controlled by the user). The aggregation module 104, in various embodiments, may provide the downloaded data to the user locally (e.g., displaying the data on an electronic display of a hardware device 102); may provide the downloaded data from the hardware device 102 of the user to and/or package the data for a remote server 110 (e.g., a backend aggregation module 104*b*) or other remote device (e.g., another hardware device 102 of the user, a hardware device 102 of a different user, or the like) which may be unaffiliated with the third-party service provider 108; may provide one or more alerts, messages, advertisements, or other communications to the user (e.g., on a hardware device 102) based on the downloaded data; or the like.

In certain embodiments, the system 100 includes a plurality of aggregation modules 104 disposed/located on hardware devices 102 of a plurality of different users (e.g., comprising hardware of and/or executable code running on one or more hardware devices 102). The plurality of aggregation modules 104 may act as a distributed and/or decentralized system 100, executing across multiple hardware devices 102, which are geographically dispersed and using different IP addresses, each downloading and/or aggregating data (e.g., photos, social media posts, medical records, financial transaction records, other financial data, and/or other user data) separately, in a distributed and/or decentralized manner. While a third-party service provider 108 (e.g., a financial institution, bank, credit union, and/or other online banking provider; a social media site; a medical provider; a photo hosting site; or the like) may block a data aggregation service or other entity from accessing data for a plurality of users from a single location (e.g., a single IP address, a single block of IP addresses, or the like), a distributed and/or decentralized swarm of many aggregation modules 104, in certain embodiments, may be much more difficult for a third-party service provider 108 to block.

In one embodiment, a hardware device 102 may include and/or execute an internet browser, which a user may use to access a server 108 of a third-party service provider 108 (e.g., by loading a webpage of the third-party service provider 108 in the internet browser). At least a portion of an aggregation module 104, in certain embodiments, may comprise a plugin to and/or an extension of an internet browser of a user's personal hardware device 102, so that a third-party service provider 108 may not block the aggregation module 104 from accessing the server 108 of the third-party service provider 108 without also blocking the user's own access to the server 108 using the internet browser. For example, the aggregation module 104 may use the same cookies, IP address, saved credentials, or the like as a user would when accessing a server 108 of a third-party service provider 108 through the internet browser. In certain embodiments, the aggregation module 104 may support integration with multiple different types of internet browsers (e.g., on different hardware devices 102).

An aggregation module 104, in certain embodiments, may mimic or copy a user's behavioral pattern in accessing a server 108 of a third-party service provider 108, to reduce a likelihood that the third-party service provider 108 may distinguish access to the server 108 by an aggregation module 104 from access to the server 108 by a user. For example, an aggregation module 104 may visit one or more locations (e.g., webpages) of a server 108 of a third-party service provider 108, even if the aggregation module 104 does not intend to download data from each of the one or more locations, may wait for a certain delay time between accessing different locations, may use a certain scroll pattern, or the like, to mask the aggregation module 104's downloading and/or aggregating of a user's data, to reduce the chances of being detected and/or blocked by the third-party service provider 108.

In one embodiment, at least a portion of an aggregation module 104 may be integrated with or otherwise part of another application executing on a hardware device 102, such as a personal financial management application (e.g., computer executable code for displaying a user's financial transactions from multiple financial institutions, determining and/or displaying a user's financial budgets and/or financial goals, determining and/or displaying a user's account balances, determining and/or displaying a user's net worth, or the like), a photo viewer, a medical application, an insurance application, an accounting application, a social media application, or the like, which may use data the aggregation module 104 downloads from a server 108 of a third-party service provider 108.

In one embodiment, the aggregation modules 104*a* comprise a distributed system 100, with the aggregation modules 104*a* and/or the associated hardware devices 102 downloading and/or aggregating data substantially independently (e.g., downloading data concurrently or non-concurrently, without a global clock, with independent success and/or failure of components). Distributed aggregation modules 104*a* may pass messages to each other and/or to a backend aggregation module 104*b*, to coordinate their distributed aggregation of data for users. In one embodiment, the aggregation modules 104*a* are decentralized (e.g., hardware devices 102 associated with users perform one or more aggregation functions such as downloading data), rather than relying exclusively on a centralized server or other device to perform one or more aggregation functions.

In a distributed and/or decentralized system 100, a central entity, such as a backend aggregation module 104*b* and/or a backend server 110, in certain embodiments, may still provide, to one or more aggregation modules 104*a*, one or more messages comprising instructions for accessing a server 108 of a third-party service provider 108 using a user's credentials, or the like. For example, a backend aggregation module 104*b* may provide one or more aggregation modules 104*a* of one or more hardware devices 102 with one or more sets of instructions for accessing a server 108 of a third-party service 108, such as a location for entering a user's electronic credentials (e.g., a text box, a field, a label, a coordinate, or the like), an instruction for submitting a user's electronic credentials (e.g., a button to press, a link to click, or the like), one or more locations of data associated with a user (e.g., a row in a table or chart, a column in a table or chart, a uniform resource locator (URL) or other address, a coordinate, a label, or the like), and/or other instructions or information, using which the aggregation modules 104*a* may access and download a user's data.

In a further embodiment, one or more aggregation modules 104*a* may pass messages to each other, such as instructions for accessing a server 108 of a third-party service provider 108 using a user's credentials, or the like, in a peer-to-peer manner. In another embodiment, a central entity, such as a backend aggregation module 104*b*, may initially seed one or more sets of instructions for accessing a server 108 of a third-party service provider 108 using a user's credentials to one or more aggregation modules 104*a*, and the one or more aggregation modules 104a may send the one or more sets of instructions to other aggregation modules 104a.

Instructions for accessing a user's data, however, in certain embodiments, may change over time, may vary for different users of a third-party service provider 108, or the like (e.g., due to upgrades, different service levels or servers 108 for different users, acquisitions and/or consolidation of different third-party service providers 108, or the like), causing certain instructions to fail over time and/or for certain users, preventing an aggregation module 104 from accessing and downloading a user's data. A backend aggregation module 104b, in one embodiment, may provide one or more aggregation modules 104a with a hierarchical list of multiple sets of instructions, known to have enabled access to a user's data from a server 108 of a third-party service provider 108. An aggregation module 104a on a hardware device 102 may try different sets of instructions in hierarchical order, until the aggregation module 104a is able to access a user's data.

An aggregation module 104, in certain embodiments, may provide an interface to a user allowing the user to repair or fix failed instructions for accessing the user's data, by graphically identify an input location for the user's electronic credentials, an instruction for submitting a user's electronic credentials, a location of data associated with the user, or the like. An aggregation module 104, in one embodiment, may highlight or otherwise suggest (e.g., bold, color, depict a visual comment or label, or the like) an estimate which the aggregation module 104 has determined of an input location for the user's electronic credentials, an instruction for submitting a user's electronic credentials, a location of data associated with the user, or the like. For example, an aggregation module 104 may process a web page of a server 108 of a third-party service provider 108 (e.g., parse and/or search a hypertext markup language (HTML) file) to estimate an input location for the user's electronic credentials, an instruction for submitting a user's electronic credentials, a location of data associated with the user, or the like.

An aggregation module 104, in certain embodiments, may provide an advanced interface for a user to graphically repair broken and/or failed instructions for accessing a user's data from a server 108 of a third-party service provider 108, which allows a user to view code of a webpage (e.g., HTML or the like) and to identify an input location for the user's electronic credentials, an instruction for submitting a user's electronic credentials, a location of data associated with the user, or the like within the code of the webpage. In one embodiment, an aggregation module 104 may provide a basic interface for a user to graphically repair broken and/or failed instructions for accessing a user's data from a server 108 of a third-party service provider 108 by overlaying a basic interface over a web page or other location of the server 108 wherein the user may graphically identify an input location for the user's electronic credentials, an instruction for submitting a user's electronic credentials, a location of data associated with the user, or the like (e.g., without requiring the user to view HTML or other code of the web page). An aggregation module 104, in certain embodiments, may provide an interface that includes a selectable list of broken and/or missing instructions, locations, or the like, and may highlight and/or display suggestions graphically in response to a user selecting an item from the list.

An aggregation module 104, in one embodiment, may test instructions provided by users (e.g., using a test set) before allowing each of the aggregation modules 104a to use the provided instructions (e.g., to prevent an abusive user from providing false or incorrect instructions). An aggregation module 104 may score or rate users based on a success rate of the users' provided instructions, and may expedite (e.g., provide to a greater number of aggregation modules 104a and/or users) the use of instructions from users with a higher score or rating. The distributed network of aggregation modules 104, in certain embodiments, may thereby be self-healing and/or self-testing, allowing continued access to and/or aggregation of users' data from one or more third-party service providers 108, even if access instructions change or become broken.

The one or more aggregation modules 104, in certain embodiments, may provide an interface (e.g., an application programming interface (API)) to provide downloaded and/or aggregated user data from servers 108 of one or more third-party service providers 108 to one or more other entities (e.g., a remote server 110 or other hardware device 102 unaffiliated with the third-party service provider 108, a backend aggregation module 104b, or the like). The interface, in one embodiment, comprises a private interface between aggregation modules 104a of users' hardware devices 102 and one or more backend aggregation modules 104b. For example, this may enable a backend aggregation module 104b to provide a user with access to downloaded and/or aggregated user data at multiple locations, on multiple hardware devices 102, through multiple channels, or the like, even if the user's hardware device 102 which downloaded the data is turned off, out of battery, not connected to the data network 106, or the like. In another embodiment, the interface comprises a public and/or open interface, which may be secured, allowing a user to share the user's downloaded data from an aggregation module 104 to one or more other tools, services, and/or other entities to store, process, and/or otherwise use the data.

In various embodiments, an aggregation module 104 may be embodied as hardware, software, or some combination of hardware and software. In one embodiment, an aggregation module 104 may comprise executable program code stored on a non-transitory computer readable storage medium for execution on a processor of a hardware device 102, a backend server 110, or the like. For example, an aggregation module 104 may be embodied as executable program code executing on one or more of a hardware device 102, a backend server 110, a combination of one or more of the foregoing, or the like. In such an embodiment, the various modules that perform the operations of an aggregation module 104, as described below, may be located on a hardware device 102, a backend server 110, a combination of the two, and/or the like.

In various embodiments, an aggregation module 104 may be embodied as a hardware appliance that can be installed or deployed on a backend server 110, on a user's hardware device 102 (e.g., a dongle, a protective case for a phone 102 or tablet 102 that includes one or more semiconductor integrated circuit devices within the case in communication with the phone 102 or tablet 102 wirelessly and/or over a data port such as USB or a proprietary communications port, or another peripheral device), or elsewhere on the data network 106 and/or collocated with a user's hardware device 102. In certain embodiments, an aggregation module 104 may comprise a hardware device such as a secure hardware dongle or other hardware appliance device (e.g., a set-top box, a network appliance, or the like) that attaches to another hardware device 102, such as a laptop computer, a server, a tablet computer, a smart phone, or the like, either by a wired connection (e.g., a USB connection) or a wireless connection (e.g., Bluetooth®, Wi-Fi®, near-field communication (NFC), or the like); that attaches to an electronic display device (e.g., a television or monitor using an HDMI port, a DisplayPort port, a Mini DisplayPort port, VGA port, DVI port, or the like); that operates substantially independently on a data network 106; or the like. A hardware appliance of an aggregation module 104 may comprise a power interface, a wired and/or wireless network interface, a graphical interface (e.g., a graphics card and/or GPU with one or more display ports) that outputs to a display device, and/or a semiconductor integrated circuit device as described below, configured to perform the functions described herein with regard to an aggregation module 104.

An aggregation module 104, in such an embodiment, may comprise a semiconductor integrated circuit device (e.g., one or more chips, die, or other discrete logic hardware), or the like, such as a field-programmable gate array (FPGA) or other programmable logic, firmware for an FPGA or other programmable logic, microcode for execution on a microcontroller, an application-specific integrated circuit (ASIC), a processor, a processor core, or the like. In one embodiment, an aggregation module 104 may be mounted on a printed circuit board with one or more electrical lines or connections (e.g., to volatile memory, a non-volatile storage medium, a network interface, a peripheral device, a graphical/display interface. The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of an aggregation module 104.

The semiconductor integrated circuit device or other hardware appliance of an aggregation module 104, in certain embodiments, comprises and/or is communicatively coupled to one or more volatile memory media, which may include but is not limited to: random access memory (RAM), dynamic RAM (DRAM), cache, or the like. In one embodiment, the semiconductor integrated circuit device or other hardware appliance of an aggregation module 104 comprises and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The one or more third-party service providers 108, in one embodiment, may include one or more network accessible computing systems such as one or more web servers hosting one or more web sites, an enterprise intranet system, an application server, an application programming interface (API) server, an authentication server, or the like. The one or more third-party service providers 108 may include systems related to various institutions or organizations. For example, a third-party service provider 108 may include a system providing electronic access to a financial institution, a university, a government agency, a utility company, an email provider, a social media site, a photo sharing site, a video sharing site, a data storage site, a medical provider, or another entity that stores data associated with a user. A third-party service provider 108 may allow users to create user accounts to upload, view, create, and/or modify data associated with the user. Accordingly, a third-party service provider 108 may include an authorization system, such as a login element or page of a web site, application, or similar front-end, where a user can provide credentials, such as a username/password combination, to access the user's data.

In one embodiment, the one or more backend servers 110 and/or one or more backend aggregation modules 104b provide central management of the networked swarm of aggregation modules 104a. For example, the one or more backend aggregation modules 104b and/or a backend server 110 may store downloaded user data from the aggregation modules 104a centrally, may provide instructions for the aggregation modules 104a to access user data from one or more third-party service providers 108 using user credentials, or the like. A backend server 110 may include one or more servers located remotely from the hardware devices 102 and/or the one or more third-party service providers 108. A backend server 110 may include at least a portion of the modules or sub-modules described below with regard to the aggregation modules 104 of FIG. 2 and FIG. 3, may comprise hardware of an aggregation module 104, may store executable program code of an aggregation module 104 in one or more non-transitory computer readable storage media, and/or may otherwise perform one or more of the various operations of an aggregation module 104 described herein in order to aggregate user data from one or more third-party service providers in a distributed manner.

In certain embodiments, one or more of the hardware devices 102, one or more of the aggregation modules 104, or the like, may comprise an identity module 112 configured to verify an identity of an associated user (e.g., to a backend server 110, to a third-party service provider 108, or the like) based on data from a sensor of a hardware device 102, based on downloaded and/or aggregated data from an aggregation module 104, based on the user's usage history of a hardware device 102, based on information queried from the user, and/or based on other information available to a hardware device 102.

In one embodiment, an identity module 112 may comprise a trusted repository of a user's identity information, which the user may authorize to provide certain identity information to one or more third-party service providers 108. For example, in certain embodiments, an identity module 112 may provide an interface for a user to provide certain identity information (e.g., name, address, telephone number, email address, social security number, drivers' license number, birthdate, gender, financial information, employment history, income data, personal reference contact information, residential address history, security question answers, mother's maiden name, city of birth, schools attended and/or years attended, spouse's name, dependent's names, or the like), which the identity module 112 may provide to a third-party service provider 108 (e.g., in order to open a new account for the user, apply for a loan, increase a credit limit, or the like for the user) in response to authorization from the user. In this manner, in one embodiment, an identity module 112 may simplify an application or startup process for a user with one or more third-party service providers 108, providing a third-party service provider 108 with a completed application nearly instantly (e.g., over the data network 106; using a wireless communications protocol such as Bluetooth®, near field communication (NFC), or the like; and/or using another electrical and/or digital communications channel), rather than requiring the user to manually fill out an application and gather the information in a process that may take hours or days, and may require further verification by the third-party service provider 108.

An identity module 112 may require verification and/or authentication from a user (e.g., electronic credentials such as username and password, fingerprint scan, retinal scan, digital certificate, PIN, challenge response, security token, hardware token, software token, DNA sequence, signature, facial recognition, voice pattern recognition, bio-electric signals, two-factor authentication credentials, or the like) prior to providing information to a third-party service provider 108 (e.g., using hardware and/or a sensor of the user's hardware device 102, or the like). An identity module 112, in certain embodiments, may monitor, store, and/or track certain sensor information (e.g., location data from a GPS sensor, a history of valid and/or invalid authentication or other identity verification events of a user, application install or usage history, mobile wallet or other electronic payment information, health information such as steps and/or heart-rate data, and/or other information), with the user's permission, in order to verify and/or authenticate the user at a later time, or the like.

In one embodiment, an identity module 112 may use sensor information, data aggregated by an aggregation module 104, or the like to dispute one or more transactions, verify and/or authenticate a transaction or other event, or the like for a user. For example, in certain embodiments, an identity module 112 may automatically and/or dynamically cross-reference a location of an aggregated transaction downloaded by an aggregation module 104 with a location indicated by sensor information to authenticate, validate, and/or verify that the transaction was made by the user. The transaction may be selected for verification by an identity module 112, disputed by a user, selected for verification by a third-party service provider 108, or the like. In one embodiment, for example, an identity module 112 may determine that a user authenticated (e.g., using a fingerprint, facial recognition, or the like) in one geographic location, at least a certain distance away from a geographic location at which a transaction occurred, and therefore determine that the transaction was fraudulent, or the like.

An identity module 112, based on sensor information, input from a user, or the like, may determine one or more known locations for a user, such as a home location, a work location, or the like, and may refuse a transaction, dispute a transaction, request verification from a user, and/or mark a transaction as fraudulent and/or invalid in response to determining that a transaction occurred (e.g., an aggregated and/or downloaded transaction) or is occurring (e.g., in real time, during runtime) at a location at least a selected threshold distance away from a known location.

To verify a transaction, if a transaction is suspected to be fraudulent, if a hardware device 102 is stolen, and/or in response to another authentication event, an identity module 112 may query a user based on previous sensor data (e.g., asking the user a question only the user would know, based on previous sensor data or the like). For example, an identity module 112 may prompt a user "where were you an hour ago?", where a previous valid location was (e.g., a location where a previous verified transaction occurred), a party of a previously verified transaction, an item and/or service purchased in a previously verified transaction, "what time did you get home last night?", "which of these applications is installed on this device", "which of these applications have you deleted from this device?", or the like to authenticate an identity of the user.

In certain embodiments, an identity module 112 may determine if an application and/or service executing on a hardware device 102 is available, has been recently accessed, or the like, which may allow a thief or other fraudulent user to determine an answer to a verification question, and may select a different question for which an answer isn't available, for which an answer hasn't been accessed, or the like. In one embodiment, a third-party service provider 108 may request a location from an internet browser being used for a transaction (e.g., a financial transaction, opening an account, changing a setting, or the like) and an identity module 112 may compare the location for the third-party service provider 108 with a location from a sensor of a hardware device 102 associated with the user, and may validate and/or authenticate the transaction in response to the locations matching (e.g., being within a certain distance of each other, or the like).

In certain embodiments, in cooperation with a password manager module 306 or the like, an identity module 112 may manage one or more of a user's passwords, and use authentication questions, sensor data, or the like to verify and/or authenticate a user. In this manner, in one embodiment, an identity module 112 may allow a user to forget passwords, instead authenticating the user based on sensor data, known questions and answers, or the like.

In one embodiment, in response to a user request and/or permission, an identity module 112 may provide information to a third-party service provider 108 (e.g., health data such as steps, heart rate, time sitting and/or standing, distance walked and/or ran, other fitness activities, sleep information, caloric intake, and/or other health or fitness data; driving information such as maximum speed, minimum speed, average speed, breaking distance, turning gravitational force, and/or other automobile driving information; financial information from electronic, mobile, and/or wireless payments, from transaction data or other financial information downloaded and/or aggregated by an aggregation module 104, and/or other transaction and/or financial information; and/or other data accessible to the identity module 112), in order to receive a discount from the third-party service provider 108 (e.g., an automobile insurance discount, a health insurance discount, or the like).

In certain embodiments, an identity module 112 may provide a third-party service provider 108 with one or more histories for the user (e.g., length of time a user has had one or more social media accounts, business accounts, email accounts, financial accounts, or the like), in order to asses a credit risk of the user, an identity of the user, or the like. In a further embodiment, an identity module 112 may verify presence of a user (e.g., based on a GPS or other sensor of a hardware device 102) during a transaction (e.g., as a "person present" and/or "card present" factor in the transaction, to lower a cost of the transaction, to prompt a user, to deny a transaction, to allow a transaction, or the An identity module 112, in certain embodiments, may allow data on a hardware device 102 to be exposed via an API (e.g., an advertising API, which a user may consent to the data to be shared, to leverage financial data through an advertising API, or the like).

In one embodiment, an identity module 112 may maintain a local credit and/or value repository, (e.g., for in-app purchases, mobile wallet or other electronic purchases, or the like). In certain embodiments, an identity module 112 may add value to a local repository from multiple other financial transactions (e.g., rounding transaction amounts up to the nearest dollar or the like, and depositing the extra amount in the local repository), to avoid additional transaction charges from separate transactions, or the like. In a further embodiment, an identity module 112 may group, batch, and/or postpone one or more transactions, to reduce a total number of transactions and reduce transaction fees (e.g., daily, weekly, monthly, or the like). An identity module 112, in a further embodiment, may allow third-party developers to add value to a local repository for a user in response to the user performing a predefined action (e.g., installing an application, sharing a link on social media or another predefined location, or the like).

An identity module 112, in certain embodiments, may provide bill pay and/or automatic payment functionality from a local repository (e.g., recurring payments, allowance to one or more children, or the like). In this manner, a user's bill pay and/or automatic payments may persist and/or be transferred, regardless of whether a user's financial institution is changed, an underlying payment source (e.g., a credit card, financial account, or the like) is changed, or the like.

An identity module 112, in one embodiment, may make one or more prompts and/or suggestions to a user based on sensor data, transaction data, or the like and one or more of the user's fitness and/or health goals (e.g., a restaurant and/or other location at which to eat or not to eat, or the like). An identity module 112, in a further embodiment, may provide data, documents, downloaded transaction, or the like to a third-party service provider 108 for tax purposes, investment purposes, or the like. An identity module 112 may comprise a robo-advisor or the like for the stock market or other investments, based on downloaded and/or aggregated financial transactions, lifestyle/mobile sensor data, or the like. In a further embodiment, an identity module 112 may automatically and/or in response to a request from a user, transmit one or more of the user's documents and/or other data to an official, or the like (e.g., sending an insurance card, a drivers' license, or the like from the identity module 112 to a police officer or other authority in response to the user being pulled over, being in a traffic accident, or the like; automatically in response to detecting an automobile accident based on sensor data; or the like). In one embodiment, an identity module 112 may automatically send a travel notification to one or more third-party service providers 108 (e.g., such that a third-party service provider 108 allows transactions from a travel location or the like) based on location sensor data from the hardware device 102, or the like.

Figure 2:
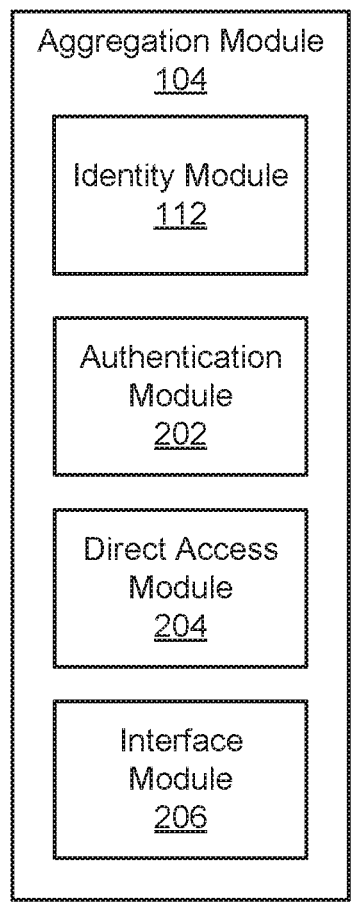
FIG. 2 is a schematic block diagram of one embodiment of an aggregation module.

FIG. 2 depicts one embodiment of an aggregation module 104. In the depicted embodiment, the aggregation module 104 includes an identity module 112, an authentication module 202, a direct access module 204, and an interface module 206.

In one embodiment, the authentication module 202 receives a user's electronic credentials for a third-party service provider 108 from the user on a hardware device 102 of the user. In a further embodiment, the authentication module 202 may receive electronic credentials for a different user (e.g., from a different hardware device 102, from a backend aggregation module 104, or the like), which may be encrypted and/or otherwise secured, so that the direct access module 204 may download data for the different user (e.g., downloading data for multiple users from a single user's hardware device 102).

For example, in the distributed/decentralized system 100, if one user's hardware device 102 is turned off, asleep, out of battery, blocked by a third-party service provider 108, or the like, in certain embodiments, an aggregation module 202 on a different user's hardware device 102 and/or on a backend server 110 may download data for the one user, using the one user's electronic credentials, and may send the data to the one user's hardware device 102, may send an alert and/or push notification to the one user's hardware device 102, or the like. In this manner, in one embodiment, a user may continue to aggregate data, receive alerts and/or push notifications, or the like, even if the user's own hardware device 102 is blocked, unavailable, or the like. In cooperation with one or more authentication modules 202, the aggregation modules 104a, 104b, in certain embodiments, may communicate with each other using a secure and/or encrypted protocol, and/or may store electronic credentials in a secure and/or encrypted manner, so that a user may not see and/or access another user's electronic credentials, downloaded data, or other private and/or sensitive data.

In embodiments where an aggregation module 104 comprises hardware (e.g., a semiconductor integrated circuit device such as an FPGA, an ASIC, or the like), the authentication module 202 may comprise dedicated security hardware for storing and/or processing electronic credentials, downloaded data, and/or other sensitive and/or private data, such as a secure cryptoprocessor (e.g., a dedicated computer on a chip or microprocessor embedded in a packaging with one or more physical security measures) which does not output decrypted data to an unsecure bus or storage, which stores cryptographic keys, a secure storage device; a trusted platform module (TPM) such as a TPM chip and/or TPM security device; a secure boot ROM or other type of ROM; an authentication chip; or the like. In another embodiment, the authentication module 202 may store and/or process electronic credentials, downloaded data, and/or other sensitive data in a secure and/or encrypted way using software and/or hardware of a user's existing hardware device 102 (e.g., encrypting data in RAM, NAND, and/or other general-purpose storage) with or without dedicated security hardware. In certain embodiments, the authentication module 202 may encrypt and/or secure data (e.g., electronic credentials, downloaded data) associated with a first user that is received by, processed by, and/or stored by a second (e.g., different) user's hardware device 102 (e.g., from the first user's hardware device 102 over the data network 106 or the like), preventing the second user from accessing the first user's data while still allowing the first user's data to be downloaded and/or aggregated from a different user's hardware device 102.

In one embodiment, as described above, electronic credentials may comprise one or more of a username and password, fingerprint scan, retinal scan, digital certificate, personal identification number (PIN), challenge response, security token, hardware token, software token, DNA sequence, signature, facial recognition, voice pattern recognition, bio-electric signals, two-factor authentication credentials, or other information whereby the authentication module 202 may authenticate and/or validate an identity of and/or an authorization of a user.

The authentication module 202, in certain embodiments, may receive different credentials from a user for different accounts of the user with different third-party service providers 108 (e.g., different social networks, different photo sharing sites, different financial institutions) so that the aggregation module 104 may download, aggregate, and/or combine the user's data from the multiple different third-party service providers 108. In one embodiment, as described below with regard to the password manager module 306 of FIG. 3, the authentication module 202, instead of and/or in addition to receiving one or more passwords or other electronic credentials from a user, may manage and/or determine one or more passwords or other electronic credentials for a user for one or more third-party service providers 108. For example, in certain embodiments, the authentication module 202 may receive an initial set of electronic credentials (e.g., a username and a password) from a user for an account of the user with a third-party service provider 108, and the authentication module 202 may use the initial set of electronic credentials to access the user's account with the third-party service provider 108 to set a new password, determined by the authentication module 202. The authentication module 202, in one embodiment, may determine passwords or other electronic credentials that are more secure than those typically created by and/or memorable to a user (e.g., longer, more numbers, greater variation between capital and lowercase letters, more frequently changed, or the like).

In one embodiment, the direct access module 204 accesses one or more servers 108 of one or more third-party service providers 108, from a hardware device 102 of a user and/or from a backend server 110, using a user's electronic credentials from the authentication module 202 (e.g., for the user associated with the hardware device 102, for a different user, or the like). The direct access module 204, in certain embodiments, downloads data associated with a user (e.g., a user's social media posts, a user's photos, a user's financial transactions, or the like) from one or more servers 108 of one or more third-party service providers 108 to a hardware device 102 of a user (e.g., of the user associated with the downloaded data, of a different user for processing and/or for transfer to the hardware device 102 of the user associated with the downloaded data, or the like) and/or to a backend server 110 associated with the direct access module 204, instead of or in addition to downloading the data directly to a hardware device 102 of the user (e.g., based on an availability of the hardware device 102 of the user, to backup the data in a second location, or the like).

The direct access module 204, in certain embodiments, may use a webpage interface of a server 108 of a third-party service provider 108 to access the server 108 using a user's electronic credentials and/or to download data associated with the user. For example, in certain embodiments, the direct access module 204 may download/load a webpage from a server 108 of a third-party service provider 108, enter a username and password or other electronic credentials for a user into textboxes in a form on the webpage, submit the username and password or other electronic credentials using a submit button or other interface element of the webpage, and/or otherwise submit electronic credentials using a website to gain authorized access to data on the server 108 associated with the user. As described below, the pattern module 308 may receive and/or provide instructions enabling the direct access module 204 to access a server 108 (e.g., a location or method for submitting electronic credentials, or the like).

In response to successfully authenticating with and accessing a server 108 of a third-party service provider 108 with a user's electronic credentials, the direct access module 204 may download data associated with the user (e.g., from a user's account or the like) from the server 108, to a hardware device 102 associated with the user, to a backend server 110, to a hardware device 102 of another user downloading the data in proxy for the user, or the like. As described below, in certain embodiments, the pattern module 308 may receive and/or provide instructions enabling the direct access module 204 to download data associated with a user from a server 108 of a third-party service provider 108 (e.g., a URL or other link to a location for the data, a label or other identifier for locating the data within one or more webpages or other data structures, or the like). The direct access module 204, in certain embodiments, may follow instructions from a pattern module 308 to authenticate and/or access data from one or more webpages from a server 108 in a screen scraping manner, parsing one or more webpages to locate an entry location and/or submit electronic credentials; to locate, download, and/or extract data associated with a user; or the like.

In one embodiment, the direct access module 204 sends or otherwise submits electronic credentials and/or receives or otherwise downloads data using an API or other access protocol of a server 108 of a third-party service provider 108. For example, the direct access module 204 may send a request in a format specified by and/or compatible with a server 108 (e.g., an API server 108) of a third-party service provider 108. The sent request may comprise electronic credentials for a user or a portion thereof (e.g., a username and/or a password), a subsequent request may comprise electronic credentials for a user or a portion thereof (e.g., in response to receiving an acknowledgment from the server 108 for the first request, or the like), and/or the direct access module 204 may use a different access protocol of a server 108.

In response to a request for data from the direct access module 204 (e.g., in response to the direct access module 204 authenticating a user using an access protocol of a server 108), a server 108 of a third-party service provider 108 may send and/or return data associated with a user (e.g., in one or more messages, packets, payloads, as a URL or other pointer to a location from where the direct access module 204 may retrieve the data, or the like). The direct access module 204, in various embodiments, may receive data associated with a user directly from a server 108 of a third-party service provider 108 over a data network 106; may receive a pointer, URL or other link to a location of data associated with a user from a server 108 of a third-party service provider 108; may receive data associated with a user from another entity on a data network 106 (e.g., in response to a request from the server 108 of the third-party service provider 108 to the other entity or the like); or may otherwise receive data associated with a user according to an access protocol of a third-party service provider 108.

In one embodiment, a third-party service provider 108 provides a direct access module 204 with an API or other access protocol. In a further embodiment, a direct access module 204 may act as a wrapper for and/or a plugin or extension of, an application of a third-party service provider 108 (e.g., a mobile application), and the application may have access to an API or other access protocol of the third-party service provider 108. In another embodiment, a direct access module 204 may be configured to use an API or other access protocol in a same manner as an application of a third-party service provider 108 (e.g., a mobile application), through observation of the application of the third-party service provider 108 or the like. In certain embodiments, a direct access module 204 may cooperate with an application of a third-party service provider 108, a web browser through which a user accesses services of a third-party service provider 108, or the like to access data associated with a user (e.g., accessing data already downloaded by an application and/or user, accessing a database or other data store of an application and/or web browser, scanning and/or screen scraping a web page of a third-party service provider 108 as a user accesses the web page, or the like).

The direct access module 204, in certain embodiments, may access different third-party service providers 108 in different manners. For example, a first third-party service provider 108 may grant the direct access module 204 with access to an API or other access protocol, while the direct access module 204 may use a web page interface (e.g., screen scraping) to access and download data from a second third-party service provider 108, or the like. In one embodiment, a remote backend server 110 may be associated with a first party service provider 110 (e.g., a vendor and/or provider of an aggregation module 104) and the direct access module 204 may download data associated with a user from both the first party service provider 110 and from one or more third-party service providers 108, aggregating the data together so that the user may access the data in a single interface and/or application. For example, as described below with regard to the interface module 206, the interface module 206 may provide a user access to the user's photos from multiple third-party cloud storage providers 108 within a single photo application, may provide a user with access to the user's personal financial information within a single personal financial management application and/or online banking application, may provide a user with access to posts from multiple social networks within a single social networking application, or the like.

The direct access module 204, in certain embodiments, may store downloaded and/or aggregated data independently from the one or more third-party service providers 108. For example, the direct access module 204 may store a user's downloaded and/or aggregated data on a hardware device 102 of the user, on a backend server 110 accessible by the user, or the like. In this manner, in certain embodiments, a user may control and/or access the user's data, even if a third-party service provider 108 closes down or is not available, may use the user's data in any manner desired by the user even if the use is not supported by a third-party service provider 108, or the like.

The direct access module 204, in one embodiment, in addition to and/or instead of downloading data from one or more third-party service providers 108, may upload data to and/or change one or more settings of one or more third-party service providers 108, in response to user input or the like. For example, in embodiments where the data comprises photos, the direct access module 204 may upload a photo from a hardware device 102 of the user to one or more third-party service providers 110 (e.g., a downloaded photo that the user has edited on the hardware device 102 or the like). In embodiments where the data comprises social media posts or other content, the direct access module 204 may receive input from a user (e.g., a photo, a textual post, one or more emoji, a video, a document or other file, or the like) and upload the received input to one or more third-party service providers 108 (e.g., social media sites or the like). In embodiments where the data comprises financial transactions or other financial data, the direct access module 204 may schedule a bill pay or other payment or funds transfer, remotely deposit a check (e.g., by uploading photos of the front and/or back of the check, or the like), and/or perform another action.

The direct access module 204 may update or change a user's account information with a third-party service provider 108, such as an account type or plan, credit card or other payment information associated with an account, a phone number or address or other contact information associated with an account, a password or other electronic credentials for an account, and/or other account information of a user for a third-party service provider 108. The direct access module 204 may update and/or upload data in a substantially similar manner to that described herein for downloading data (e.g., determining a user's electronic credentials for a third-party service provider 108, accessing a server 108 of the third-party service provider 108, uploading and/or providing data to the third-party service provider 108, or the like).

In one embodiment, the interface module 206 provides a user's data downloaded by the direct access module 204, from a hardware device 102 of a user (e.g., of the user associated with the downloaded data, of a different user) to another entity, such as a hardware device 102 of a user associated with the downloaded data (e.g., in response to the data being downloaded by a hardware device 102 of a different user, from one hardware device 102 of a user to another hardware device 102 of the same user), a remote server 110 or other remote device 102 unaffiliated with (e.g., not owned by, operated by, controlled by, or the like) the third-party service provider 108 from which the data was downloaded, or the like. For example, the interface module 206 may provide an API or other interface to provide a user's downloaded and/or aggregated data to a hardware device 102 of the user, to a backend aggregation module 104b, to a backend server 110, to a different third-party service provider 108, to a different/second hardware device 102 of the user, or the like.

In certain embodiments, it may be transparent and/or substantially transparent to a user (e.g., not apparent) which hardware device 102, 110 has downloaded data associated with the user. For example, the interface module 206 may provide downloaded data associated with a user from one hardware device 102 of the user to another hardware device 102 of the user, from a hardware device 102 of the user to a backend server 110 (e.g., from which the user may access the data using a web browser, an application, or the like), from a backend server 110 to a hardware device 102 of the user, or the like, allowing the user to access the data from a different location than the location to which the data was downloaded.

In certain embodiments, the interface module 206 provides a graphical user interface (GUI) on a hardware device 102 of a user, and provides downloaded data associated with the user to the user through the GUI (e.g., allowing the user to view the data directly, providing one or more notifications and/or recommendations to the user based on the data, providing one or more tables or charts to the user based on the data, providing a summary of or one or more statistics related to the data, or the like). The interface module 206, in various embodiments, may provide a GUI to the user from the same hardware device 102 to which the data was downloaded, on a different hardware device 102 than the hardware device 102, 110 to which the data was downloaded, or the like.

For example, in one embodiments, where the data associated with a user comprises photos, the interface module 206 may provide a photo management interface, a photo editing interface, or the like wherein the user may view and/or otherwise access the user's downloaded and/or aggregated photos. In a further embodiment, where the data associated with a user comprises the user's financial transaction history (e.g., purchases and/or other financial transactions downloaded from one or more financial institutions 108 such as banks, credit unions, lenders, or the like), the interface module 206 may provide a personal financial management interface, with a list of transactions, one or more budgets, one or more financial goals, a debt management interface, a net worth interface, and/or another personal financial management interface wherein the user may view the user's downloaded and/or aggregated financial transaction history, and/or alerts or recommendations based thereon. In another embodiment, where the data associated with a user comprises social media posts, the interface module 206 may provide a GUI comprising a stream, feed, and/or wall of social media posts for the user to view (e.g., downloaded and/or aggregated social media posts from multiple social networks 108, from different contacts or friends of the user, or the like).

The interface module 206, in certain embodiments, may provide one or more access controls to a user, allowing the user to define which devices 102, users, third-party service providers 110, or the like may access which data. For example, the interface module 206 may provide an interface for a user to allow and/or restrict certain mobile applications, certain APIs for third-party services, certain plugins or extensions, certain users, certain hardware devices 102, and/or one or more other entities to access data downloaded for the user from one or more third-party service providers 108 (e.g., with access controls by third-party service provider 108 or other data source, by data type, by entity requesting access, and/or at another granularity). In this manner, the aggregation module 104, in certain embodiments, may comprise a local repository of aggregated data, which one or more other devices 102 and/or services may access and use, with a user's permission.

Figure 3:
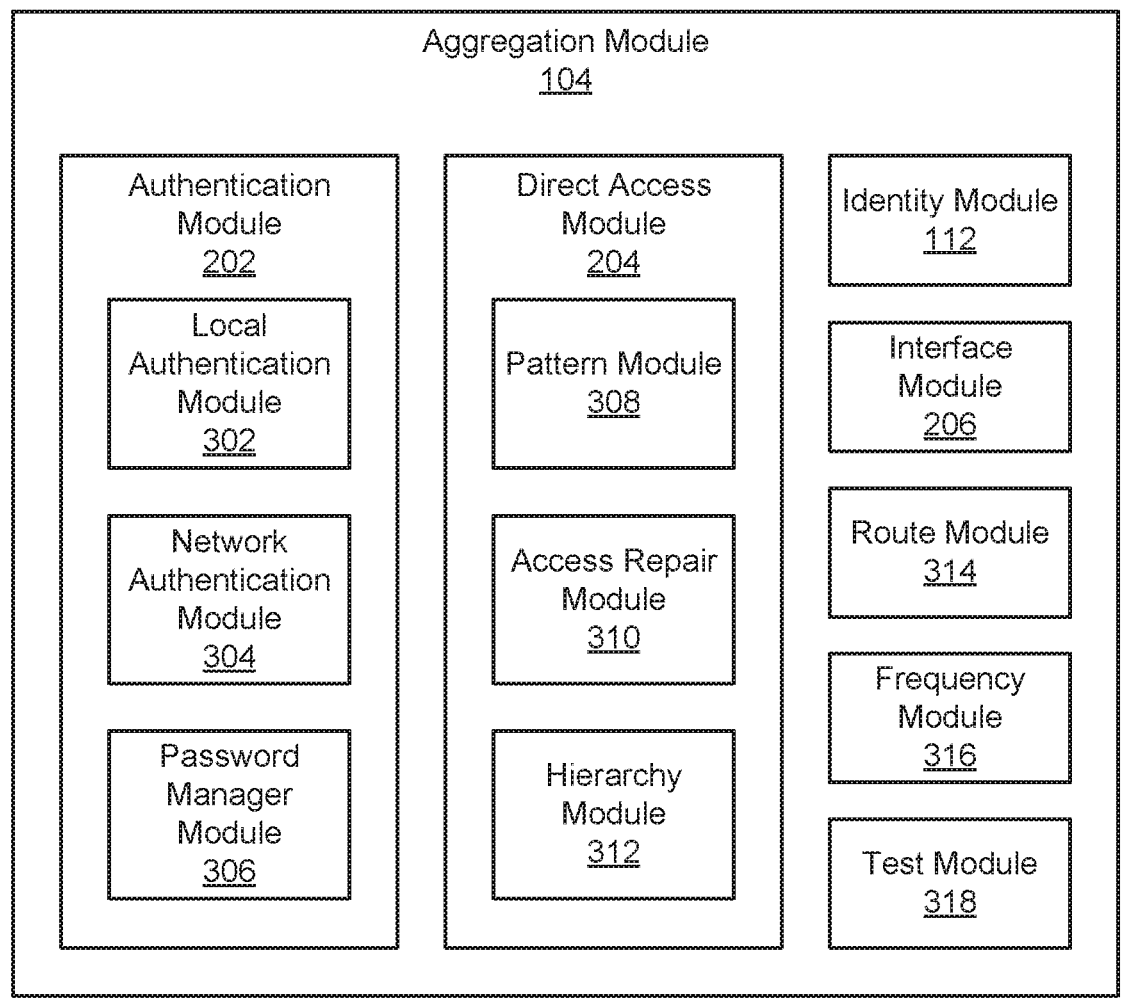
FIG. 3 is a schematic block diagram of another embodiment of an aggregation module.

FIG. 3 depicts another embodiment of an aggregation module 104. In the depicted embodiment, the aggregation module 104 includes an identity module 112, an authentication module 202, a direct access module 204, and an interface module 206 and further includes a route module 314, a frequency module 316, and a test module 318. The authentication module 202, in the depicted embodiment, includes a local authentication module 302, a network authentication module 304, and a password manager module 306. The direct access module 204, in the depicted embodiment, includes a pattern module 308, an access repair module 310, and a hierarchy module 312.

In one embodiment, the local authentication module 302 secures and/or authenticates the user's access to downloaded data, to stored passwords, and/or other data on a user's hardware device 102, transferred to and/or from a user's hardware device 102, or the like. For example, the local authentication module 302 may cooperate with one or more security and/or authentication systems of the user's hardware device 102, such as a PIN, password, fingerprint authentication, facial recognition, or other electronic credentials used by the user to gain access to the hardware device 102. In a further embodiment, the local authentication module 302 may authenticate a user before allowing the interface module 206 to provide the user access to downloaded/aggregated data and/or alerts or other messages. For example, the local authentication module 302 may manage and/or access electronic credentials associated with the aggregation module 104, for a user, and may authenticate the user in response to the user accessing an application and/or service of the aggregation module 104.

In certain embodiments, the local authentication module 302 may encrypt and/or otherwise secure, on a user's hardware device 102, electronic credentials and/or downloaded data associated with a different user, so that the user may not access data associated with the different user, but the different user may access the data once it is transmitted to a hardware device 102 of the different user, to a backend server 110, or the like. Local authentication modules 302 of different hardware devices 102, 110 may cooperate to securely transfer data (e.g., one or more electronic credentials, downloaded data, or the like) over the data network 106, from one hardware device 102, 110 to another hardware device 102, 110. In a further embodiment, the local authentication module 302 may ensure that a user's electronic credentials and/or downloaded data remain on a single hardware device 102 (e.g., are not transmitted on a data network 106), in a secure repository or the like, and are not stored on and/or accessible to a backend server 110, a hardware device 102 of another user, or the like.

In one embodiment, the network authentication module 304 receives and/or stores a user's electronic credentials for one or more third-party service providers 108 on a hardware device 102 of the user, on a backend server 110, or the like. The network authentication module 304, in various embodiments, may receive a user's electronic credentials from the user, from a hardware device 102 of the user, from a backend server 110, or the like. The network authentication module 304 may cooperate with the direct access module 204 to provide a user's electronic credentials to a server 108 of a third-party service provider 108 (e.g., the network authentication module 304 may provide electronic credentials to the direct access module 204 to provide to a server 108, the network authentication module 304 may provide electronic credentials directly to a server 108, or the like).

The network authentication module 304, in certain embodiments, may cooperate with the local authentication module 302 to encrypt and/or otherwise secure a user's electronic credentials for one or more third-party service providers 108, on a hardware device 102 of a user, on a data network 106, on a hardware device 102 of a different user, on a backend server 110, while being provided to a server 108 of a third-party service provider 108, or the like. In a further embodiment, the network authentication module 304 ensures that a user's electronic credentials are only stored on a user's hardware device 102 and sent from the user's hardware device 102 to a server 108 of a third-party service provider 108, and does not store a user's electronic credentials on a backend server 110, on a different user's hardware device 102, or the like. In another embodiment, the network authentication module 304 may securely store (e.g., using secure encryption) a user's electronic credentials for a third-party service provider 108 on a backend server 110, on a different user's hardware device 102, or the like, so that a direct access module 204 may access and/or download data associated with the user, even if the hardware device 102 of the user is unavailable, blocked, or the like, as described below with regard to the route module 314. In certain embodiments, whether the network authentication module 304 and/or the local authentication module 302 allow electronic credentials to be sent to and/or stored by a different user's hardware device 102, a backend server 110, or the like may be based on a setting defined based on user input, so that the user may decide a level of security, or the like.

In one embodiment, the password manager module 306 may manage and/or store electronic credentials of a user for a plurality of third-party service providers 108, so that the direct access module 204 may access and/or download data associated with the user from each of the plurality of third-party service providers 108. The password manager module 306, in certain embodiments, may generate and/or otherwise manage different, secure, credentials for each of a plurality of third-party service providers 108.

The password manager module 306, in one embodiment, may securely store generated credentials for a user on a hardware device 102 of the user, so that the user does not have to remember and enter the generated electronic credentials. For example, in addition to allowing a direct access module 204 to access a third-party service provider 108 using generated electronic credentials, the password manager module 306 may automatically populate one or more interface elements of a form on a webpage with electronic credentials (e.g., a username, a password) of the user, in response to the user visiting the web page in a web browser, or the like, without the user manually entering the electronic credentials. The password manager module 306, in certain embodiments, may periodically update (e.g., regenerate different credentials, such as a different password, and update the user's account with the third-party service provider 108 with the regenerated different credentials) electronic credentials for a user, such as every week, every month, every two months, every three months, every four months, every five months, every six months, every year, every two years, in response to a user request, in response to a request from a third-party service provider 108, and/or over another time period or in response to another periodic trigger.

The password manager module 306, in one embodiment, may synchronize a user's electronic credentials (e.g., provided by the user, generated by the password manager module 306, or the like) across different hardware devices 102, web browsers, or the like of a user. For example, in response to a password manager module 306 and/or the user updating or otherwise changing electronic credentials, the password manager module 306 may propagate the update/change to one or more other password manager modules 306, on different hardware devices 102 of the user, or the like.

In one embodiment, the pattern module 308 determines an ordered list (e.g., a pattern, a script, or the like) of multiple locations on one or more servers 108 of a third-party service provider 108 for the direct access module 204 to access the server (e.g., which may include locations other than where the data of the user is stored and/or accessible), one or more delays for the direct access module 204 to wait between accessing locations on the server 108, and/or other components of an access pattern for accessing data of a server. Locations, in certain embodiments, comprise independently addressable and/or accessible content and/or assets provided by one or more servers of a third-party service provider 108, or the like, such as webpages, portions of a webpage, images or other data files, databases or other data stores, pages or sections of a mobile application, or the like. The pattern module 308, in one embodiment, determines a pattern/ordered list that contains one or more locations and/or delays that are not necessary for the direct access module 204 to access or use in order to download desired data, but instead, the pattern/ordered list may make it difficult or impossible for the third-party service provider 108 to distinguish between the direct access module 204 accessing a server of the third-party service provider 108 and a user accessing the server of the third-party service provider.

The pattern module 308, in one embodiment, may determine and/or select the multiple locations and/or the one or more delays (e.g., a pattern/ordered list) based on an average pattern or a combined pattern identified in or based on behavior of multiple users accessing a third-party service provider 108 using a web browser, a mobile application, or the like. The pattern module 308, in one embodiment, may monitor one or more users (e.g., for a predetermined period of time or the like) as they access a server of a third-party service provider 108, tracking which links, data, webpages, and/or other locations the one or more users access, how long the one or more users access different locations, an order in which the one or more users access locations, or the like. In certain embodiments, the one or more monitored users may be volunteers, who have provided the pattern module 308 with authorization to temporarily or permanently monitor the users' access, in order to provide a more realistic access pattern for the direct access module 204 to use to access a server of a third-party service provider 108.

In a further embodiment, the pattern module 308 determines and/or selects multiple locations and/or one or more delays between accessing different locations based on a pattern identified in behavior of the user associated with the hardware device 102 on which the pattern module 308 is disposed, accessing the third-party service using a web browser, a mobile or desktop application, or other interface of the user's hardware device 102. For example, the pattern module 308 may comprise network hardware of the user's hardware device 102 (e.g., a network access card and/or chip, a processor, an FPGA, an ASIC, or the like in communication with the data network 106 to monitor data and/or interactions with a server of a third-party service provider 108), a web browser plugin or extension, a mobile and/or desktop application executing on a processor of the user's hardware device 102, or the like. The pattern module 308 may request and receive authorization from the user to monitor the user's activity with regard to one or more servers of one or more third-party service providers 108 from the user's hardware device 102.

The pattern module 308, in certain embodiments, may update a pattern/ordered list over time, based on detected changes in access patterns of one or more users or the like. In one embodiment, the pattern module 308 may coordinate and/or cooperate with the access repair module 310, described below, to update a pattern/ordered list in response to a server 108 of a third-party service provider 108 and/or data associated with a user becoming broken and/or inaccessible.

In one embodiment, the access repair module 310 detects that access to a server 108 of a third-party service 108 and/or data associated with a user is broken and/or becomes inaccessible. The access repair module 310, in certain embodiments, provides an interface to a user allowing the user to graphically identify an input location for the user's electronic credentials, a location of data associated with the user, or the like. For example, the access repair module 310 may provide a GUI, a command line interface (CLI), an API, and/or another interface allowing an end user to identify an input location for electronic credentials, an action for submitting electronic credentials, a location of data, or the like. The access repair module 310, in one embodiment, provides an interface to a user on a hardware device 102 of the user.

In certain embodiments, for example, the access repair module 310 may overlay an interface over one or more pages of a website of a third-party service provider 108 on an electronic display screen of a user's hardware device 102, as described in greater detail below with regard to FIGS. 5A-5B. The access repair module 310 may provide one or more interfaces (e.g., GUIs, CLIs, APIs, overlays, or the like) to multiple users, allowing multiple users to define a repair and/or update for access to a server of a third-party service provider 108 (e.g., in a distributed and/or decentralized manner, from different hardware devices 102 or the like over a network 106).

The access repair module 310, in certain embodiments, may determine and/or display one or more suggestions 504 and/or recommendations 504 for the user, which the user may either confirm or change/correct (e.g., in a basic interface, a standard interface, a beginning user interface, or the like). For example, the access repair module 310 may display one or more interface elements with a suggested location for a user to enter a user name, a suggested location for a user to enter a password, a suggested credential submit action, a suggested location of data associated with the user, and/or one or more other interface elements allowing a user to graphically identify one or more locations within a website of a third-party service provider 108.

The access repair module 310, in certain embodiments, processes one or more pages of and/or other locations on a server 108 (e.g., one or more websites, web apps, or the like) to determine an estimate and/or prediction of an input location for a user's electronic credentials, an action for submitting a user's electronic credentials, a location of data associated with a user, or the like. In one embodiment, the access repair module 310 may estimate one or more locations and/or actions (e.g., by scanning and/or parsing one or more pages of a website, based on input from other users accessing one or more pages of a website, based on previous interactions of the user with one or more pages of a website, a prediction made using a machine learning and/or artificial intelligence analysis of a website, based on a statistical analysis of historical changes to one or more pages of a website and/or of one or more similar websites, or the like). The access repair module 310 may display to a user in an interface an estimate and/or prediction of an input location for the user's electronic credentials, a location of data associated with the user, or the like so that the user may confirm whether or not the estimate and/or prediction is correct using the interface.

The access repair module 310 may indicate one or more estimated locations and/or actions with an arrow or other pointer to a location; a link or other identifier of a location; a box or other highlighting around a location; by altering text labeling for a location to make the text bold, italic, and/or underlined; or the like. A user, in certain embodiments, may click, select, or otherwise identify a location to either confirm or change/correct a location suggested by the access repair module 310. For example, a user may click or otherwise select an interface element associated with a location and/or action and may click or otherwise select the location and/or perform the action, which the access repair module 310 may record (e.g., automatically populating a text field identifying the location and/or action, recording a macro allowing the action to be automatically repeated without the user, for a different user, or the like).

In certain embodiments, instead of or in addition to a standard, basic, or beginning user interface, the access repair module 310 may provide an advanced interface, for experienced users or the like, with source code of a website and/or other details of the website. For example, in one embodiment, an advanced access repair interface may allow one or more advanced users to identify one or more locations and/or actions within source code of a website, which may not be visible and/or readily apparent in the website itself. In certain embodiments, the access repair module 310 may provide a user interface element allowing a user to select and/or toggle between a standard user interface or view and an advanced user interface or view.

In one embodiment, the test module 318 cooperates with the access repair module 310 to verify whether or not one or more received locations and/or instructions from a user are accurate (e.g., usable to access data from a server of a third-party service provider 108). The test module 318, in certain embodiments, attempts to access a server 108 of a third-party service provider 108 for a plurality of different users (e.g., a sample group or test set), based on an identification the access repair module 310 received from a single user, using electronic credentials of the different users or the like.

The test module 318, in certain embodiments, determines whether data associated with the different users (e.g., a sample group or test set) is accessible using the identification from the single user. The test module 318 may repeatedly attempt to access data from a third-party service provider 108 using identifications which the access repair module 310 received from different users (e.g., on different hardware devices 102 and sent to the test module 318 on a single hardware device 102 over the data network 106, sent to multiple test modules 318 on different hardware devices 102 over the data network 106, sent to a test module 318 on a central backend server 110, or the like).

The test module 318, in one embodiment, provides one or more identifications from a user to other instances of the direct access module 204 (e.g., other test modules 318) for accessing a server 108 of a third-party service provider 108 in response to an amount of the different users (e.g., a sample group or test set) for which data is accessible using the identification from the single user satisfying a threshold. For example, if the identification from the single user successfully allows a predefined number of other test users (e.g., 2 users, 10 users, 100 users, 1000 users, 50% of test users, 75% of test users, and/or another predefined threshold number of test users) to access their data from a third-party service provider 108, the test module 318 may provide instructions based on the identification to more users (e.g., all or substantially all users, or the like).

In certain embodiments, the test module 318 may successively increase a test size comprising a number of users to which the test module 318 provides instructions for accessing their data from a third-party service provider 108 using an identification from a single user (e.g., starting with one or more test users, increasing to two or more, three or more, four or more, five or more, ten or more, twenty or more, thirty or more, forty or more, fifty or more, one hundred or more, five hundred or more, one thousand or more, five thousand or more, ten thousand or more, one hundred thousand or more, a million or more, and/or other successively increasing numbers of test users). The test module 318, in one embodiment, includes instructions based on an identification from a single user in an ordered list of multiple different sets of instructions for accessing a server 108 of a third-party service provider 108, as described in greater detail below with regard to the hierarchy module 312.

The test module 318, in certain embodiments, is configured to prioritize identifications from one or more users based on one or more trust factors for the one or more users (e.g., scores or the like). A trust factor, in one embodiment, may comprise a score or other metadata indicating a likelihood that a user's identification is correct. For example, in various embodiments, a trust factor may include and/or be based on one or more of a history of a user's previous identifications (e.g., correct or incorrect), a user's affiliation with a provider (e.g., a creator, a vendor, an owner, a seller, a reseller, a manufacturer, the backend server 110, or the like) of the one or more aggregation modules 104, positive and/or negative indicators (e.g., votes, likes, uses, feedback, stars, endorsements, or the like) from other users, and/or other indicators of whether or not a user's identification is likely to be correct. The test module 318 may determine how many other users to provide a user's identification based on one or more trust factors associated with the user (e.g., accelerating a rate at which a user's identification is provided to other users in response to a higher trust factor, decreasing a rate at which a user's identification is provided to other users in response to a lower trust factor, or the like).

The test module 318 may provide an override interface, allowing an administrator, moderator user, or the like to remove an identification, adjust and/or override an identification, adjust and/or override a trust factor for a user, ban a user from providing identifications, and/or otherwise override a user or a user's identification. In various embodiments, the test module 318 may provide an override interface to an administrator and/or moderator as a GUI, an API, a CLI, or the like.

In certain embodiments, the test module 318 causes the one or more aggregation modules 104 and their aggregation services to be self-healing, self-testing, and/or self-incrementally deploying, as it tests and uses the most effective solutions, or the like (e.g., sets of instructions based on indications from one or more users).

In one embodiment, the hierarchy module 312 provides the direct access module 204 with an ordered list of multiple different sets of instructions for accessing a server 108 of a third-party service provider 108 using a user's electronic credentials, for downloading data associated with the user, or the like. Each different set of instructions, in certain embodiments, comprises a location for entering a user's electronic credentials, an instruction for submitting the user's electronic credentials, one or more locations of the data associated with the user, or the like.

The hierarchy module 312, in one embodiment, may receive one or more sets of instructions from a backend server 110 (e.g., a backend aggregation module 104b of a backend server 110), from another user hardware device 102 in a peer-to-peer manner (e.g., an aggregation module 104a of a user hardware device 102), from a test module 318, or the like. The hierarchy module 312, in certain embodiments, may receive multiple different sets of instructions already in an ordered list (e.g., a global hierarchical order) based on a history of successful and/or unsuccessful uses of the different sets of instructions by different user hardware devices 102 and/or users, or the like. In one embodiment, the hierarchy module 312 may determine a hierarchy for and/or create an ordered list from multiple different sets of instructions for a single user (e.g., a custom or individualized hierarchy) based on a history of successful and/or unsuccessful uses of the different sets of instructions by the user (e.g., from one or more hardware devices 102 of the user).

The direct access module 104, in one embodiment, may iterate through an ordered list of multiple sets of instructions for accessing a server 108 of a third-party service provider 108, in the order of the list, until one of the sets of instructions is successful and the direct access module 104 is able to access and/or download data from the third-party service provider 108. The hierarchy module 312, in one embodiment, may place a most recent successfully used set of instructions at the top (e.g., as the first set to try). For example, the hierarchy module 312 for a user's hardware device 102 may place a set of instructions for accessing a third-party service provider 108 at the top of a list (e.g., adjusting an order of the list over time) in response to the direct access module 204 successfully accessing and/or downloading data from the third-party service provider 108 using the set of instructions. In certain embodiments, the hierarchy module 312 may receive an ordered list of multiple different sets of instructions for accessing a server 108 of a third-party service provider 108 in a first order (e.g., a global order) and may dynamically adjust and/or rearrange the different sets of instructions over time based on a single user's/hardware device 102's use (e.g., moving a set of instructions up in the list if access using the set of instructions is successful for the user/hardware device 102, moving a set of instructions down in the list if access using the set of instructions is unsuccessful for the user/hardware device 102, or the like).

The hierarchy module 312, in certain embodiments, may be configured to share one or more sets of instructions, an ordered list of multiple sets of instructions, or the like with a hierarchy module 312 of another user's hardware device 102 over a data network 106 (e.g., directly to the other user's hardware device 102 in a peer-to-peer manner, indirectly by way of a backend aggregation module 104b of a backend server 110, or the like). Different sets of instructions may be successful or unsuccessful for different users, in various embodiments, due to different account types, different account settings, different originating systems (e.g., due to a corporate acquisition or the like, different users of the same third-party service provider 108 may have one or more different settings, different access methods, or the like), system changes or upgrades, and/or another difference in accounts, services, or the like for different users of the same third-party service provider 108.

In one embodiment, the route module 314 determines whether a hardware device 102 of a user is available for the direct access module 204 to download data associated with the user from a server 108 of a third-party service provider 108. The route module 314, in certain embodiments, may access a server 108 of a third-party service provider 108, from a remote backend server 110, using the user's electronic credentials, to download data associated with the user from the server 108 to the remote backend server 110 in response to the route module 314 determining that the hardware device 102 of the user is unavailable. The route module 314, in one embodiment, provides a user one or more alerts (e.g., downloaded data from a third-party service provider 108, a recommendation or suggestion determined based on data from a third-party service provider 108, a notification or other alert based on an event or other trigger detected in data from a third-party service provider 108, or the like) on a hardware device 102 of the user based on the data associated with the user downloaded to the remote backend server 110.

In certain embodiments, the route module 314 maintains and/or stores a list of multiple hardware devices 102 associated with a single user and/or account. In response to determining that one hardware device 102 associated with a user and/or account is unavailable (e.g., powered down, in airplane mode, not connected to the data network 106, or the like), the route module 314 may access a server 108 of a third-party service provider 108 from a different, available hardware device 102 of the user and/or account, may provide one or more notifications or other alerts on a different, available hardware device 102, or the like. The route module 314, in various embodiments as described below with regard to FIGS. 4A-4C, may dynamically route downloading of data for a user from a third-party service provider 108 between multiple hardware devices, such as one or more hardware devices 102 of the user, one or more hardware devices 102 of a different user, one or more backend servers 110, and/or another hardware device, in a secure manner.

The route module 314, in one embodiment, may alternate or rotate between multiple hardware devices 102, 110 (e.g., of the same user, of different users, or the like) for downloading data for the same user from a third-party service provider 108 periodically. For example, rotating and/or alternating devices 102, 110 from which data is downloaded, may decrease a likelihood that the downloading will be misinterpreted as fraudulent or improper. In another embodiment, the route module 314 may download data from the same device 102, 110 (e.g., a primary hardware device 102 of a user, a backend server 110, or the like), which may be authorized and/or identified by the third-party service provider 108 as a trusted device, or the like.

In one embodiment, the frequency module 316 sets a frequency with which the direct access module 204 accesses the server 108 of a third-party service provider 108. The frequency module 316, in certain embodiments, determines a frequency based on input from a remote backend server 110, which may be unaffiliated with the third-party service provider 108 being accessed, so that the remote backend server 110 (e.g., the frequency module 316 executing on the remote backend server 110) determines frequencies for a plurality of direct access modules 204 for different users and/or different hardware devices 102. For example, the frequency module 316 may limit a single user and/or hardware device 102 from accessing the same third-party service provider 108 more than an allowed threshold number of times within a time period (e.g., once every ten minutes, once every half an hour, once every hour, twice a day, three times a day, four times a day, or the like). The frequency module 316, in certain embodiments, limits an access frequency to prevent inadvertent denial of service by a third-party service provider 108, or the like.

The frequency module 316, in certain embodiments, may dynamically adjust a frequency with which a user and/or hardware device 102 may access a third-party service provider 108 over time. For example, the frequency module 316 may monitor access and/or downloads by multiple users (e.g., all users, available users, active users, or the like) to cap or limit a total access and/or download bandwidth for each of the different third-party service providers 108 (e.g., so as not to overwhelm any single third-party service provider 108, or the like). In this manner, in one embodiment, a user and/or hardware device 102 may access and/or download data with a higher frequency when fewer other users and/or hardware devices 102 are accessing and/or downloading data (e.g., low peak times), but may be limited to a lower cap or access frequency when more other users and/or hardware devices 102 are accessing and/or downloading data (e.g., high peak times).

In a further embodiment, the frequency module 316 determines a frequency based on input from a user, allowing the user to set the access frequency independently of other users and/or of a backend server 110. The frequency module 316 may provide a user interface (e.g., a GUI, CLI, API, or the like) allowing a user to set and/or adjust an access frequency for downloading data from one or more third-party service providers 108 using one or more hardware devices 102 (e.g., providing different settings allowing the user to set different access frequencies for different third-party service providers 108, different hardware devices 102 of the user, or the like).

Figure 4A:
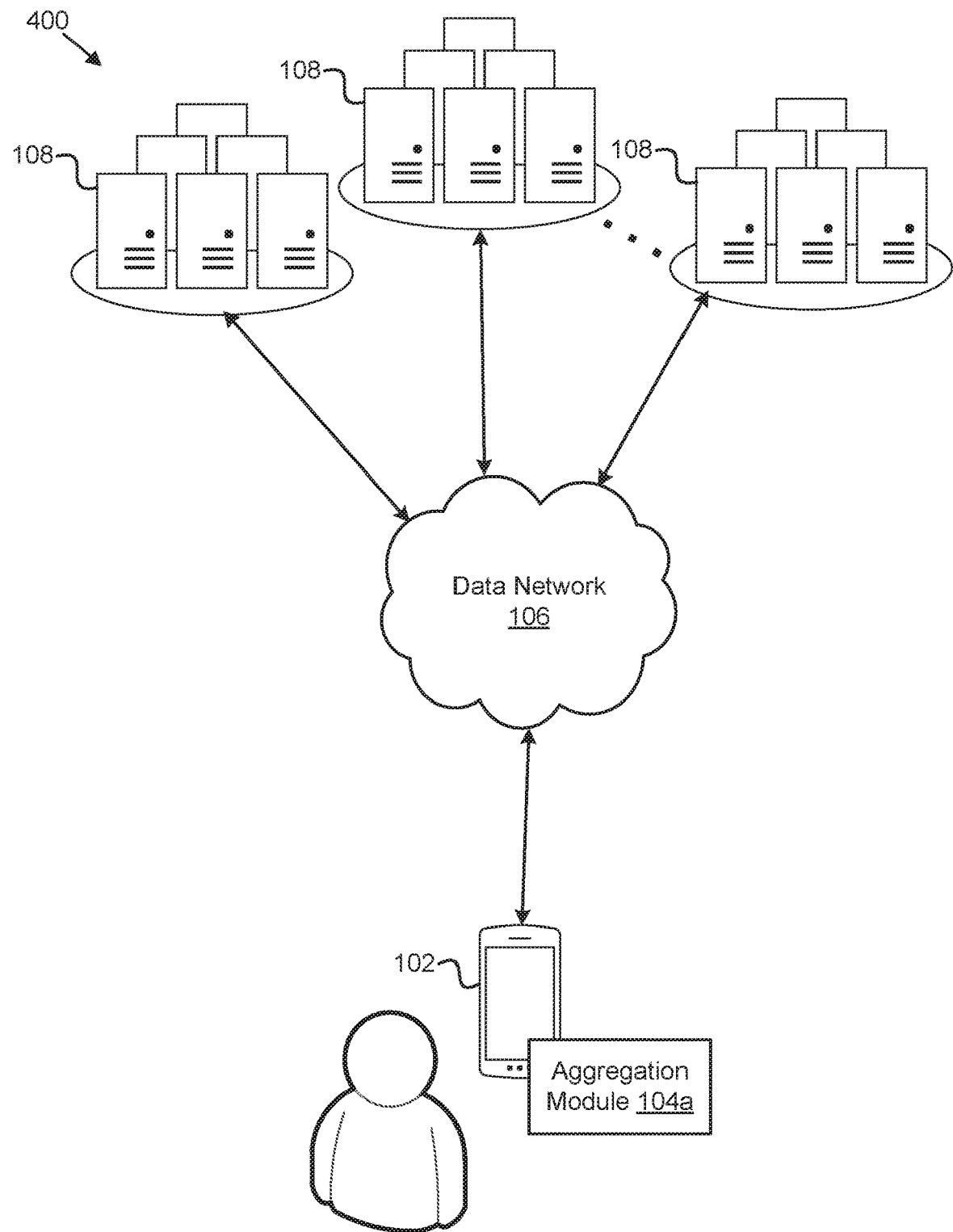
FIG. 4A is a schematic block diagram illustrating an additional embodiment of a system for mobile device based identity verification.

FIG. 4A depicts one embodiment of a system 400 for mobile device based identity verification. The system 400, in the depicted embodiment, includes a single user hardware device 102 with an aggregation module 104a. An authentication module 202 of the aggregation module 104a, in certain embodiments, may store and/or manage electronic user credentials locally on the user's hardware device 102, the direct access module 204 may access one or more third-party service providers 108 directly from the user's hardware device 102 (e.g., over the data network 106) to download data associated with the user to the user's hardware device 102, the interface module 206 may provide the data and/or one or more alerts/messages based on the data to the user from the user's hardware device 102, or the like. In the depicted system 400, the aggregation module 104a may create a local repository of data for the user from one or more third-party service providers 108, on the user's hardware device 102, without providing the user's credentials, the user's data, or the like to a different user's hardware device, to a backend server 110, or the like.

Figure 4B:
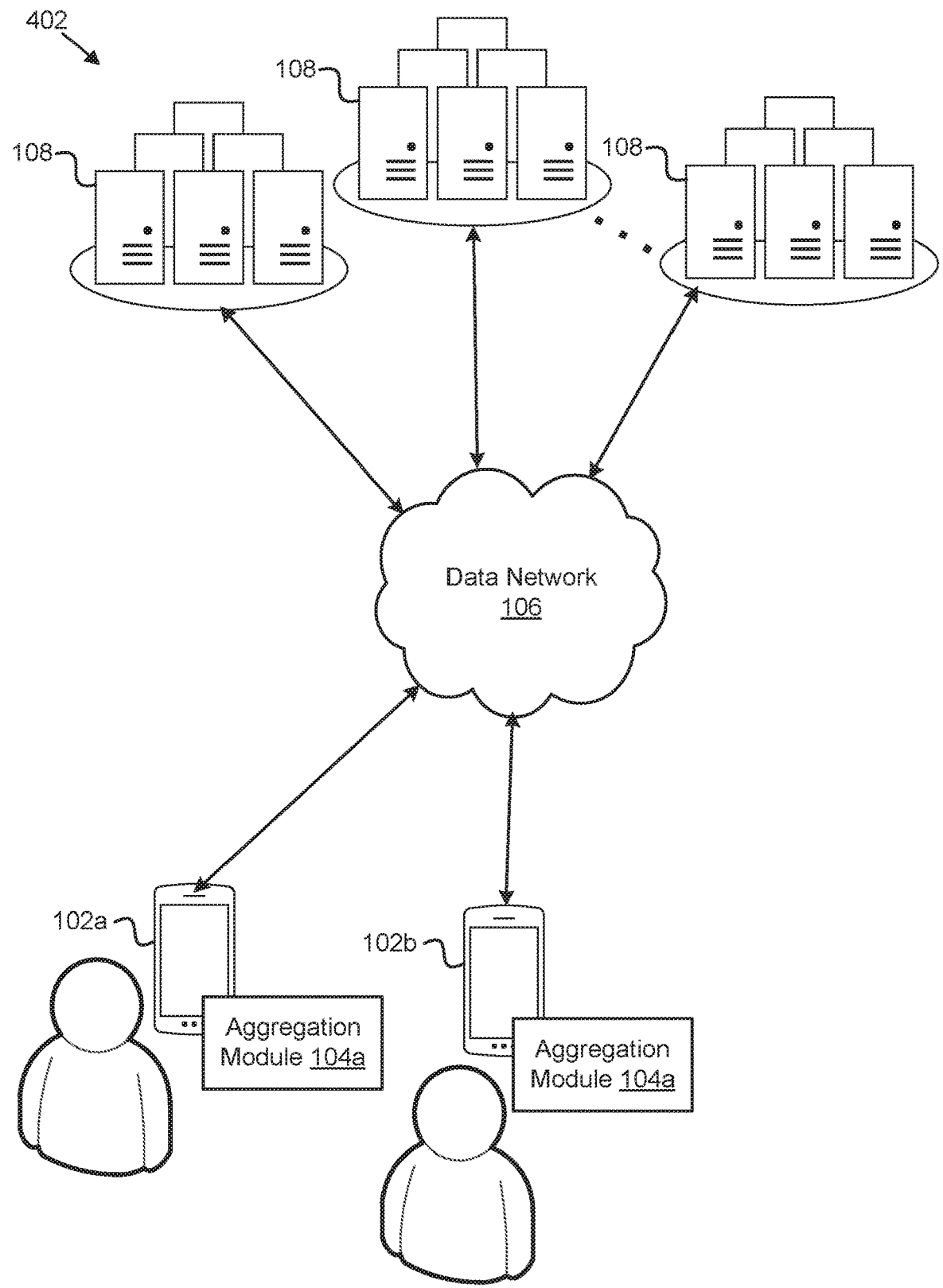
FIG. 4B is a schematic block diagram illustrating a further embodiment of a system for mobile device based identity verification.

FIG. 4B depicts one embodiment of a system 402 for mobile device based identity verification. The system 402, in the depicted embodiment, includes a plurality of user hardware devices 102 with aggregation modules 104a, associated with different users. In certain embodiments, a first aggregation module 104a (e.g., an authentication module 202 of the first aggregation module 104a) may securely provide encrypted user credentials for a first user from the first user's hardware device 102a to a second aggregation module 104a (e.g., an authentication module 202 of the second aggregation module 104a), over the data network 106 or the like, so that a direct access module 204 of the second aggregation module 104a may access one or more third-party service providers 108 from the second user's hardware device 102b (e.g., over the data network 106) to download data associated with the first user.

For example, the second user's hardware device 102b may download data for the first user in response to the first user's hardware device 102a being powered off, being asleep, being blocked from accessing one or more third-party service providers 108, or the like, as determined by a route module 314, or the like. The interface module 206 of the second aggregation module 104a may provide one or more alerts/messages to the first user based on the downloaded data and/or may provide the downloaded data to the first user (e.g., in response to the first user's hardware device 102a becoming available, to a different hardware device 102 associated with the first user, to a backend server 110 to which the first user has access, or the like). As described above, in certain embodiments, the authentication module 202, the direct access module 204, the interface module 206, and/or the route module 314 may encrypt and/or otherwise secure data for the first user (e.g., the first user's electronic credentials, downloaded data associated with the first user, alerts/messages for the first user), so that it is difficult or impossible for the second user to access the data for the first user, thereby preventing and/or minimizing unauthorized access to the first user's data while providing greater flexibility in devices 102 and/or locations from which data for the first user may be downloaded.

Figure 4C:
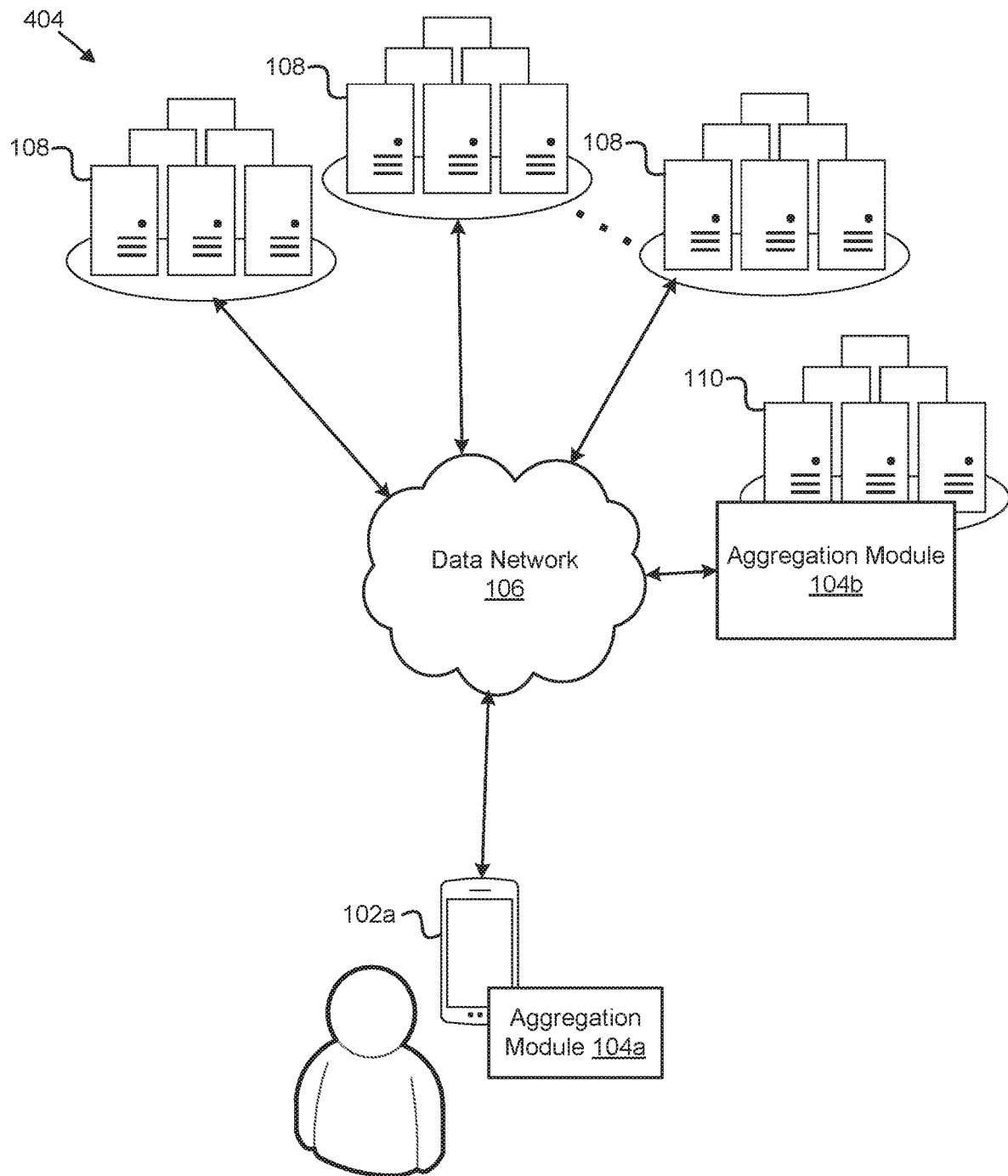
FIG. 4C is a schematic block diagram illustrating a certain embodiment of a system for mobile device based identity verification.

FIG. 4C depicts one embodiment of a system 404 for mobile device based identity verification. The system 404, in the depicted embodiment, includes one or more user hardware devices 102 with one or more aggregation modules 104a, and one or more backend servers 110 comprising one or more backend aggregation modules 104b. An authentication module 202 of an aggregation module 104a, in certain embodiments, may securely provide encrypted user credentials for a user from the user's hardware device 102 to a backend aggregation module 104b (e.g., an authentication module 202 of the backend aggregation module 104b) on a backend server 110, over the data network 106 or the like, so that a direct access module 204 of the backend aggregation module 104b may access one or more third-party service providers 108 from the backend server 110 (e.g., over the data network 106) to download data associated with the user.

For example, the backend server 110 may download data for the user in response to the user's hardware device 102a being powered off, being asleep, being blocked from accessing one or more third-party service providers 108, or the like, as determined by a route module 314, or the like. The interface module 206 of the backend aggregation module 104b may provide one or more alerts/messages to the user based on the downloaded data and/or may provide the downloaded data to the user (e.g., in response to the user's hardware device 102a becoming available, to a different hardware device 102 associated with the first user, directly from the backend server 110 as a web page and/or through a dedicated application, or the like).

Figure 5A:
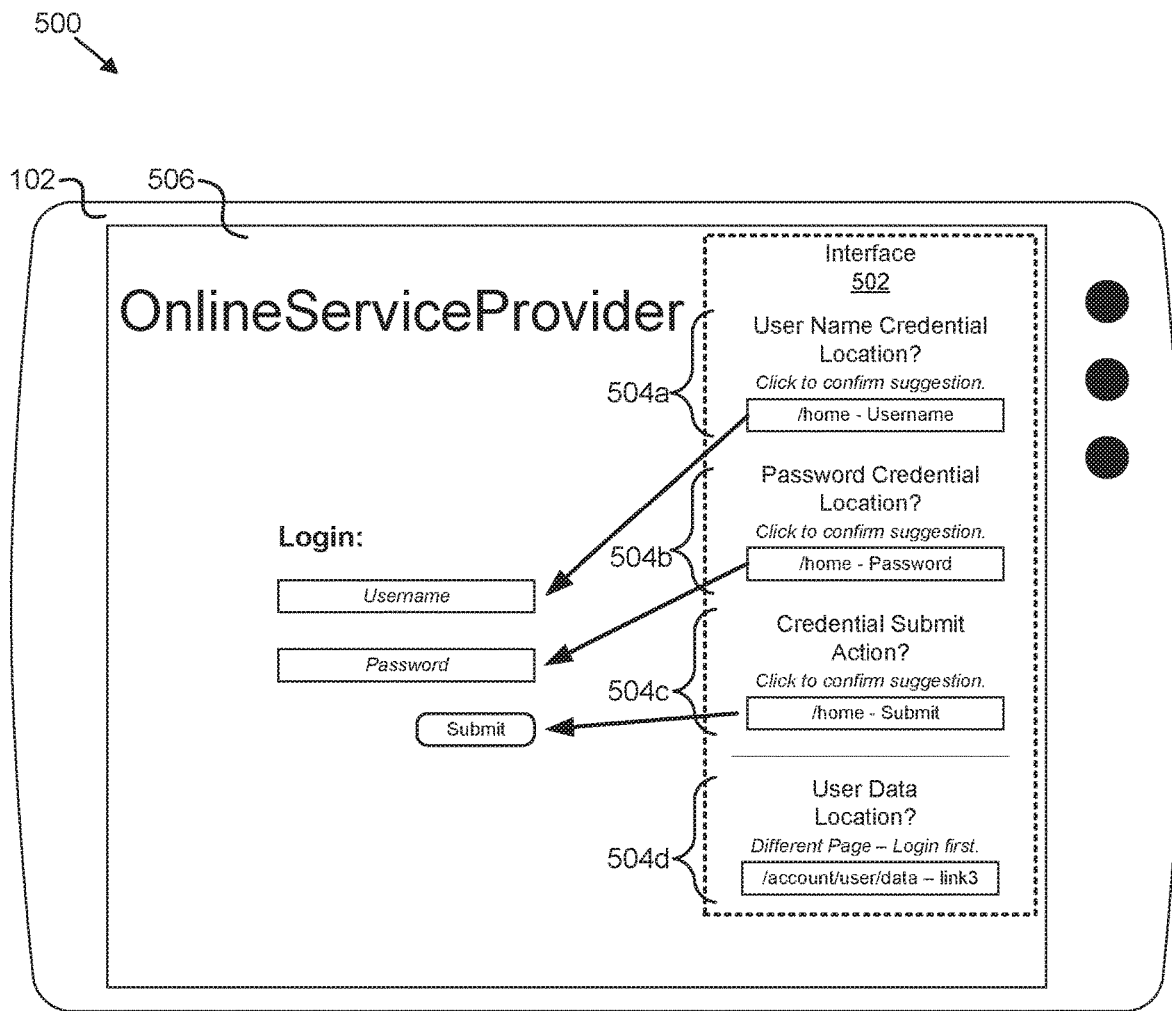
FIG. 5A is a schematic block diagram illustrating one embodiment of a user interface.

FIG. 5A depicts one embodiment of a user interface 500. The interface 500, in certain embodiments, is provided by an access repair module 310 to a user on an electronic display screen of a hardware device 102, allowing a user to graphically identify one or more input locations for the user's credentials (e.g., a location for a username, a location for a password, or the like), a method for sending and/or submitting the user's credentials (e.g., an API specification, a location of a submit button, or the like), a location of data associated with the user (e.g., a URL or other link; a location on a web page at a link; a label, tag, or other identifier within plain text and/or source code of a web page 506; or the like) and/or to graphically identify one or more other instructions for accessing data associated with the user from a third-party service provider 108.

In the depicted embodiment, the access repair module 310 overlays an interface 502 over one or more pages of a website 506 of a third-party service provider 108 on an electronic display screen of a user's hardware device 102. As described above, in various embodiments, the access repair module 310 may comprise a browser plugin and/or extension which provides an interface 502 within an internet browser, may comprise an embedded browser within an application of the access repair module 310, or may otherwise be integrated with and/or in communication with an internet browser.

The access repair module 310, in the depicted embodiments, determines and/or displays one or more suggestions 504 and/or recommendations 504 for the user, which the user may either confirm or change/correct. For example, the access repair module 310 may display an interface element 504a with a suggested location for the user to enter a user name, an interface element 504b with a suggested location for the user to enter a password, an interface element 504c with a suggested credential submit action, an interface element 504d with a suggested location of data associated with the user, and/or one or more other interface elements allowing a user to graphically identify one or more locations within a website 506 of a third-party service provider 108.

In one embodiment, an interface element 504 may include one or more identifiers of an estimated location and/or action which the access repair module 310 has determined (e.g., by scanning and/or parsing one or more pages of a website 506, based on input from other users accessing one or more pages of a website 506, based on previous interactions of the user with one or more pages of a website 506, a prediction made using a machine learning and/or artificial intelligence analysis of a website 506, based on a statistical analysis of historical changes to one or more pages of a website 506 and/or of one or more similar websites, or the like), such as an arrow or other pointer to a location; a link or other identifier of a location; a box or other highlighting around a location; altering text labeling for a location to make the text bold, italic, and/or underlined; or the like. A user, in certain embodiments, may click, select, or otherwise identify a location to either confirm or change/correct a location suggested by the access repair module 310. For example, a user may click or otherwise select an interface element 504 associated with a location and/or action (e.g., to activate the selected interface element 504) and may click or otherwise select the location and/or perform the action, which the access repair module 310 may record (e.g., automatically populating a text field identifying the location and/or action, recording a macro allowing the action to be automatically repeated without the user, or the like).

The user, in one embodiment, may interact with the website 506 in order to locate and/or identify one or more locations, perform one or more actions, or the like. For example, in certain embodiments, the user may navigate to one or more different pages within the website 506, may login to the website 506 using the user's electronic credentials for the website 506, may navigate to a different website 506, may navigate to and/or download data associated with the user from the website 506, may use the website 506 in a usual manner, or the like. As described above with regard to the pattern module 308, the pattern module 308, in one embodiment, may monitor the user's access pattern for the website 506, allowing the direct access module 204 to at least partially emulate the user's access pattern in accessing the website 506, downloading data associated with the user from the website 506, or the like. In the depicted embodiment, the access repair module 310 (and/or an associated browser) displays a browser view of the website 506, with text, images, and/or other elements displayed substantially how an internet browser would display the website 506, with the addition of the interface 502 displayed over the website 506, to one side of the website 506, or the like.

Figure 5B:
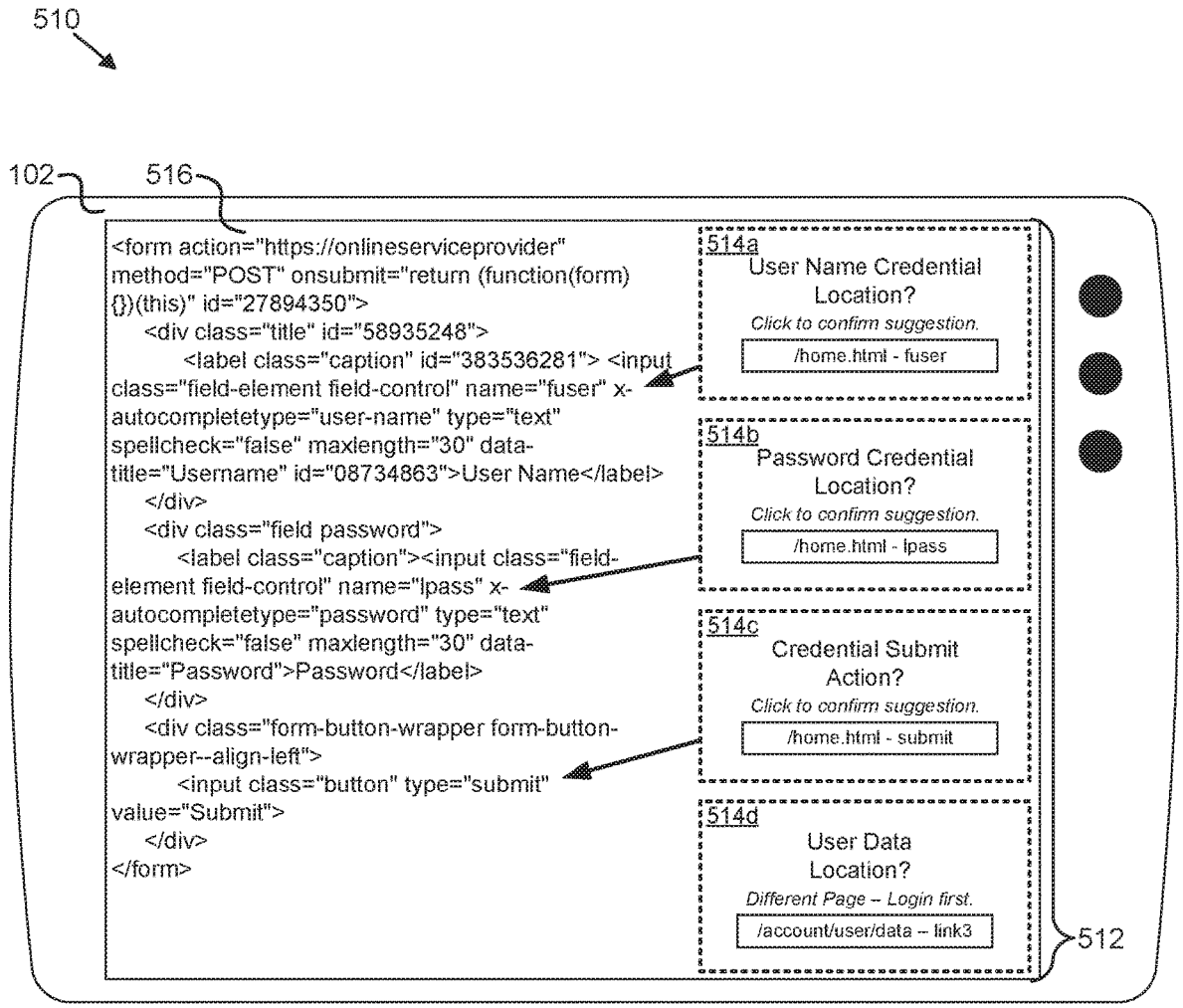
FIG. 5B is a schematic block diagram illustrating another embodiment of a user interface.

FIG. 5B depicts one embodiment of a user interface 510. While the user interface 500 described above comprises a rendered, browser view of one or more pages of a website 506, in one embodiment of the interface 510 of FIG. 5B, the access repair module 310 (and/or an associated browser) displays source code 516 of a website 506. For example, in one embodiment, the user interface 500 may comprise a standard access repair interface and the user interface 510 may comprise an advanced access repair interface, allowing one or more advanced users to identify one or more locations and/or actions within source code 516 of a website 506, which may not be visible and/or readily apparent in the website 506 itself. In certain embodiments, a user may select and/or toggle between a standard user interface 500 or view and an advanced user interface 510 or view.

In the depicted embodiment, the access repair module 310 displays a user interface 512 over and/or adjacent to the displayed source code 516, with one or more interface elements 514a-d allowing a user to identify one or more locations, actions, or the like substantially as described above. The access repair module 310, in the depicted embodiment, displays one or more suggestions and/or estimates of locations and/or actions, which the user may confirm and/or change/correct. In various embodiments, a user may identify a location and/or an action in the source code 516 by selecting and/or activating an interface element 514 and selecting a portion of the source code 516, by dragging a portion of the source code 516 and dropping the portion onto an interface element 514, by cutting and pasting a portion of the source code 516 into an interface element 514, and/or otherwise identifying a location and/or an action based on the source code 516.

In response to a user identifying one or more locations and/or actions (e.g., for entering, submitting, and/or sending electronic credentials; for locating and/or downloading data; or the like), in certain embodiments, the access repair module 310 may cooperate with the test module 318 to perform a live and/or real-time test of the identified one or more locations and/or actions, to determine the validity and/or effectiveness of the identified one or more locations and/or actions while the interface 500, 510 is visible to and/or in use by the user, allowing the user to change and/or correct provided information during the same session. For example, the access repair module 310 may display a test button or other user interface element to a user, which the user may select and/or activate to initiate a test. In another embodiment, the access repair module 310 may automatically perform a test in response to a user providing a location and/or action, without the user selecting and/or activating a test button or other user interface element. In a further embodiment, the test module 318 may perform one or more tests independent of the access repair module 310, with or without testing functionality of the access repair module 310.

Figure 6:
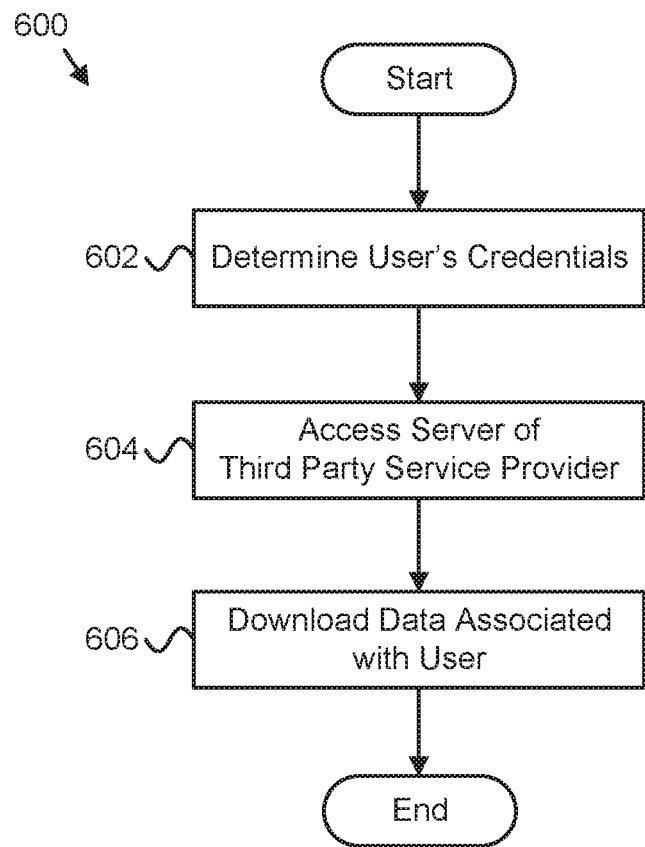
FIG. 6 is a schematic flow chart diagram illustrating one embodiment of a method for mobile device based identity verification.

FIG. 6 depicts one embodiment of a method 600 for distributed data aggregation. The method 600 begins and an authentication module 202 receives 602 a user's electronic credentials for a third-party service provider 108 from the user on a hardware device 102 of the user. A direct access module 204 accesses 604 a server 108 of the third-party service provider 108, from the hardware device 102 of the user, using the user's electronic credentials. A direct access module 204 downloads 606 data associated with the user from the server 108 of the third-party service provider 108 to the hardware device 102 of the user.

Figure 7:
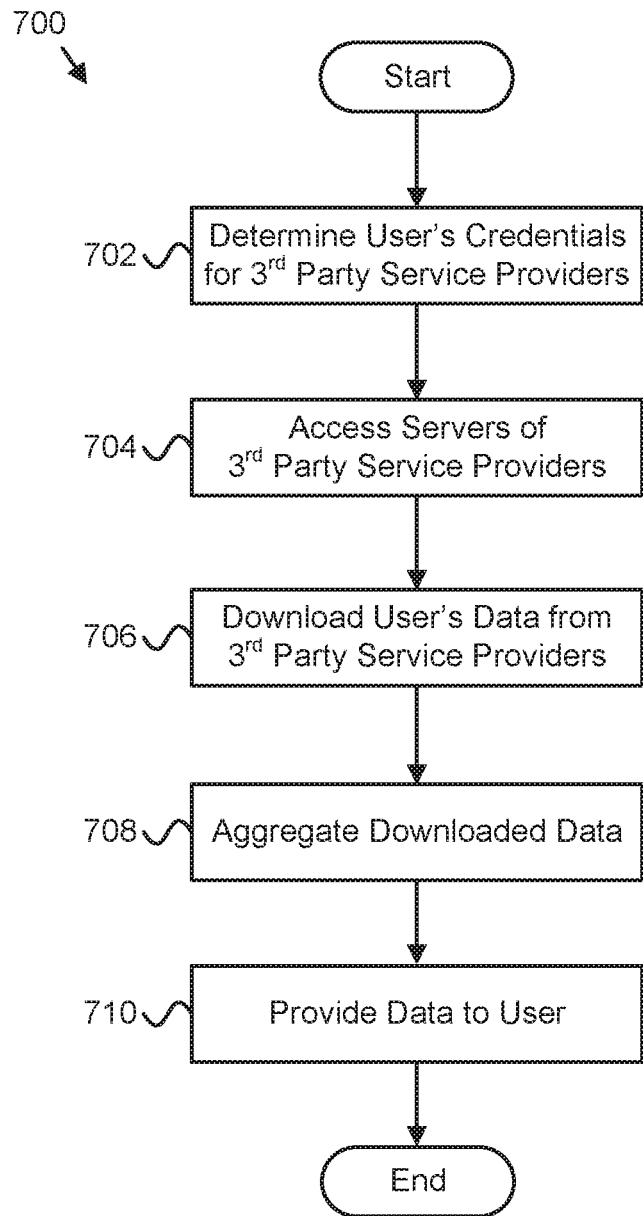
FIG. 7 is a schematic flow chart diagram illustrating a further embodiment of a method for mobile device based identity verification.

FIG. 7 depicts one embodiment of a method 700 for mobile device based identity verification. The method 700 begins and an authentication module 202 determines 702 a user's electronic credentials for a plurality of third-party service providers 108. A direct access module 204 accesses 704 servers of the plurality of third-party service providers 108 using the determined 702 electronic credentials. A direct access module 204 downloads 706 data associated with the user from the accessed 704 servers of the plurality of third-party service providers 108.

A direct access module 204 aggregates 708 the downloaded 706 data from the plurality of different third-party service providers 108. An interface module 206 provides 710 the aggregated 708 data to the user (e.g., displaying the data on a hardware device 102 of the user, sending an alert or other message to a hardware device 102 of the user, sending the data to a remote backend server 110 unaffiliated with the third-party service providers 108 which the user may access using a web interface and/or API, or the like) and the method 700 ends.

Figure 8:
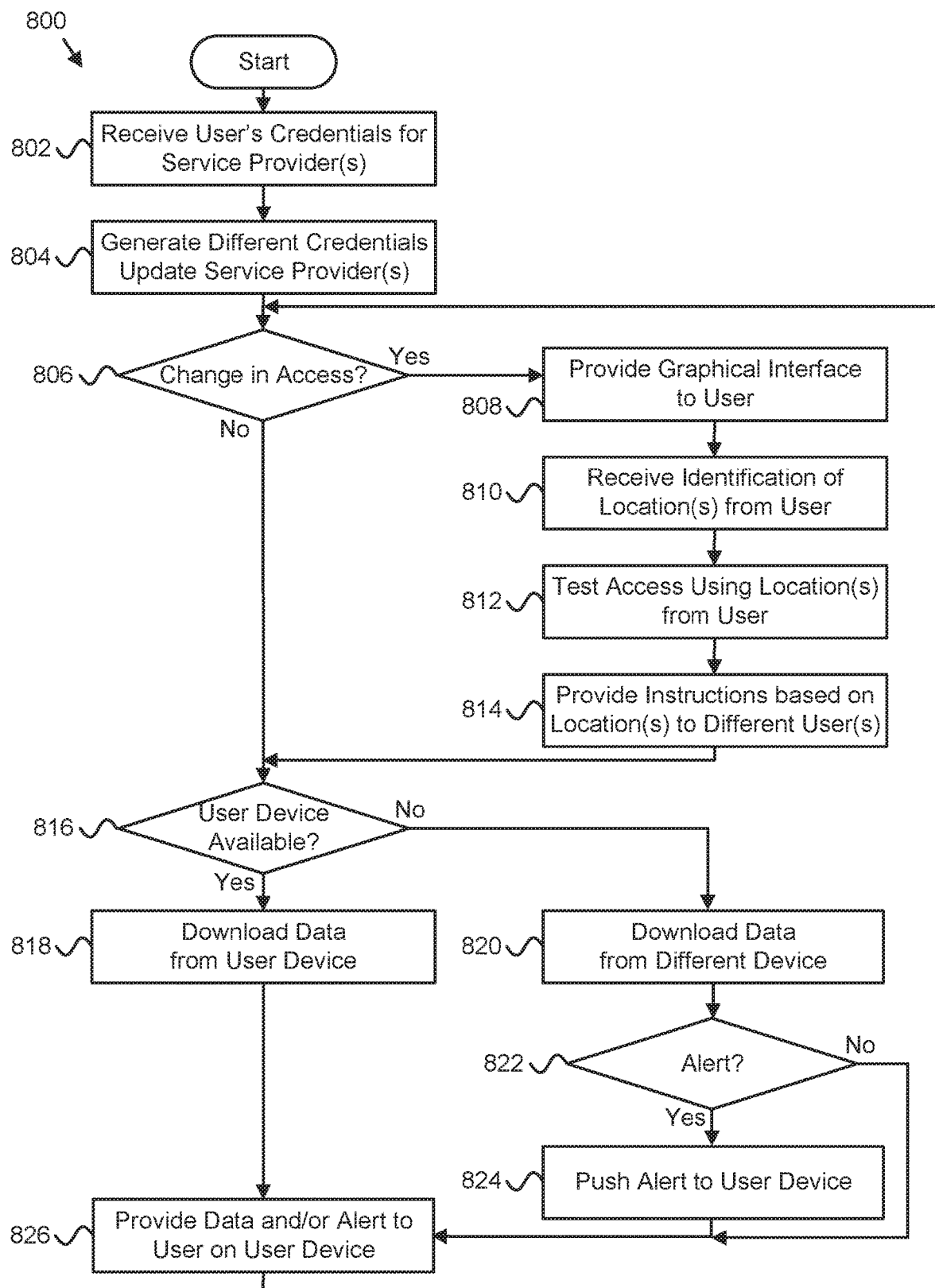
FIG. 8 is a schematic flow chart diagram illustrating another embodiment of a method for mobile device based identity verification.

FIG. 8 depicts another embodiment of a method 800 for mobile device based identity verification. The method 800 begins and a network authentication module 304 receives 802 a user's electronic credentials for one or more third-party service providers 108. A password manager module 306 generates 804 new and/or different electronic credentials for the one or more third-party service providers 108 and updates the user's account(s) with the one or more third-party service providers 108 with the generated 804 electronic credentials.

An access repair module 310 determines 806 whether or not there is a change in access for the one or more third-party service providers 108 (e.g., whether access is broken or unavailable, whether access is partial or incomplete, whether access bandwidth is slower than previously determined, and/or whether another change in access has occurred). If the access repair module 310 determines 806 that access for a third-party service provider 108 has changed, the access repair module 310 provides 808 a graphical user interface 500, 510 to the user. The access repair module 310 receives 810, through the provided 808 graphical user interface 500, 510, an identification of one or more locations and/or actions for authenticating the user and/or downloading data from the third-party service provider 108. The test module 318 tests 812 access to the third-party service provider 108 using the received 810 identification of one or more locations and/or actions. In response to successful testing 812 by the test module 318, the test module 318 and/or the pattern module 308 provide 814 instructions for accessing and/or downloading data from the third-party service provider 108 based on the received 810 identification of one or more locations and/or actions to one or more direct access modules 204 associated with one or more different users.

A route module 314 determines 816 whether a hardware device 102 associated with the user is available. In response to the route module 314 determining 816 that a hardware device 102 associated with the user is available, a direct access module 204 downloads 818 data associated with the user from one or more third-party service providers 108 from the available hardware device 102 associated with the user.

In response to the route module 314 determining 816 that a hardware device 102 associated with the user is not available, a direct access module 204 of a different device (e.g., a hardware device 102 of a different user, a backend server 110, or the like) downloads 820 data associated with the user from one or more third-party service providers 108 from the different device. A route module 314 (e.g., on a different device 102, 110) determines 822 whether an alert or other message is available for the user based on the downloaded 820 data and pushes 824 and/or otherwise sends the alert or other message to a device 102 associated with the user (e.g., an unavailable device 102) in response to determining 822 that the alert or other message is available. For example, in one embodiment, a hardware device 102 of a user may be unavailable for downloading data (e.g., powered down, offline, asleep, using mobile data instead of Wi-Fi, or the like), but may receive a pushed 824 alert or other message anyway (e.g., over a different channel, such as a text message, a voicemail, an email, a push notification, or the like) and/or may receive a pushed 824 alert or other message in response to becoming available at a later time.

An interface module 206 provides 826 the downloaded 818, 820 data and/or the pushed 824 alert to the user (e.g., displaying the data on a hardware device 102 of the user, displaying a pushed/sent 824 alert or other message on a hardware device 102 of the user, sending the data to a remote backend server 110 unaffiliated with the third-party service provider 108 which the user may access using a web interface and/or API, or the like). The method 800, in certain embodiments, continues, periodically determining 806 whether there is a change in access for a third-party service provider 108, determining 816 whether a hardware device 102 of the user is available, downloading 818, 820 data associated with the user, and/or providing 826 downloaded data and/or a pushed 824 alert or other message to the user, or the like.

Figure 9:
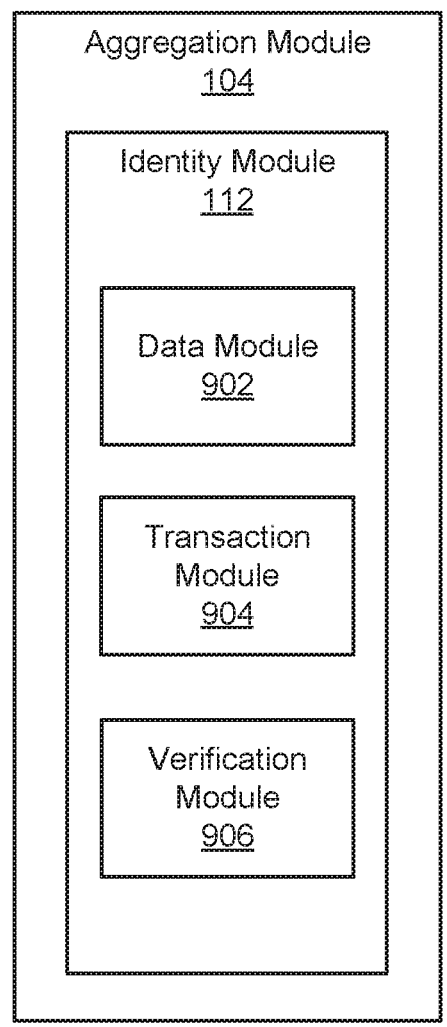
FIG. 9 is a schematic block diagram of another embodiment of an aggregation module.

FIG. 9 depicts one embodiment of an aggregation module 104 that includes an instance of an identity module 112 for mobile device based identity verification. In one embodiment, the identity module 112 includes one or more of a data module 902, a transaction module 904, and a verification module 906, which are described in more detail below.

The data module 902, in one embodiment, is configured to receive sensor data from a hardware device 102 associated with a user. In one embodiment, the hardware device 102 is substantially similar to the hardware devices 102 described above with reference to FIG. 1. In further embodiments, the hardware devices 102 may include various sensors for monitoring, detecting, collecting, storing, sensing, checking, logging, or the like environmental data associated with the user. The sensors may include location sensors (e.g., GPS sensors), proximity sensors, infrared sensors, weather sensors (e.g., thermometer, barometer, or the like), biometric sensors (e.g., heart rate monitor, fingerprint sensor, retinal scan sensor, facial recognition sensor, pulse sensor, blood pressure sensor, and/or the like), and/or the like.

In some embodiments, the data module 902 receives sensor data that is stored at an aggregation server (e.g., a backend server 110). In such an embodiment, the sensor data comprises historical sensor data that was previously collected from the hardware device 102 and stored at the aggregation server. In certain embodiments, the data module 902 receives sensor data in real-time, e.g., as the data is monitored and collected from the hardware device 102. In some embodiments, the sensor data corresponds to aggregated data stored at the aggregation server such as aggregated financial data, aggregated transaction data, aggregated multimedia data, or the like. For example, a location sensor for a hardware device 102 may determine the device's location in response to a user associated with the hardware device 102 completing or performing a transaction at a merchant such that the location data is associated with or corresponds to the transaction data (which may comprise separate location information as part of the transaction data that identifies the location of the transaction).

In certain embodiments, the data module 902 receives sensor data from the user's hardware device 102 at predefined intervals such as every minute, every fifteen minutes, every, hour, or the like. In further embodiments, the data module 902 receives sensor data in response to a request for the sensor data. For instance, the data module 902 may request sensor data from the user's hardware device 102 while a transaction is being performed.

In one embodiment, the transaction module 904 is configured to receive transaction data associated with a transaction. The transaction may comprise transactions like a purchase at a merchant, closing a mortgage loan, a credit check, a loan application, a withdrawal or deposit at a bank, and/or the like. The transaction data may comprise metadata describing the amount of the transaction, the time of the transaction, the date of the transaction, the location of the transaction, the name of the institution where the transaction occurred, an identifier for the person that processed the transaction, whether the transaction was electronic or in-person, the method of payment (e.g., case, card swipe, card chip, or the like), and/or the like.

As described above, the transaction data may comprise transaction data that is aggregated from a plurality of third-party data sources. For example, the transaction data may comprise financial transaction data aggregated from different financial institutions such as banks. The aggregated transaction data may include historical transaction data for previously completed transactions. In some embodiments, the transaction data includes real-time transaction data that is received during a transaction, while a transaction is ongoing, or the like. For instance, the transaction module 904 may receive transaction data when a user swipes a card to purchase an item at a retailer prior to the transaction being completed or authorized. In such an embodiment, the transaction data may include metadata, described above, that provides the details of the transaction even though the transaction has not yet been authorized or completed.

In one embodiment, the verification module 906 is configured to verify an identity of the user that is making the transaction, or has already made a transaction, based on the received sensor data. For example, the verification module 906 may cross-reference various sensor data that corresponds to a transaction to verify that the sensor data validates, corroborates, supports, or the like the information in the transaction data, which provides evidence that the transaction was legitimate (e.g., performed by the user, authorized by the user, or the like) and is not a fraudulent transaction.

For example, the verification module 906 may compare location data that the data module 902 receives from location sensors on a user's hardware device 102 to a location of a transaction (as determined based on the transaction metadata) to verify that the locations match or are within a predetermined distance, proximity, radius, diameter, or the like of one another. If so, then the verification module 906 may conclude that the user that performed the transaction was the authorized user to perform the transaction, e.g., the user was actually at the merchant making the purchase. Otherwise, the verification module 906 may determine that the user making the purchase is not the user associated with the sensor data (because the sensor data indicates that that the hardware device 102 is at a different location than the merchant's location) and may deny, reject, or the like the transaction; may generate an alert that the transaction is fraudulent; may prompt the user to confirm the transaction; and/or the like.

In this manner, the identity module 112 can use sensor data to confirm or verify a user's identity while transactions are being made, to dispute or confirm historical transactions, and/or the like. The identity module 112 adds another layer of security, fraud detection, identity verification, and/or the like, in addition to other security measures such as two-factor authentication, to prevent unauthorized use of the user's accounts, devices, and/or the like.

Figure 10:
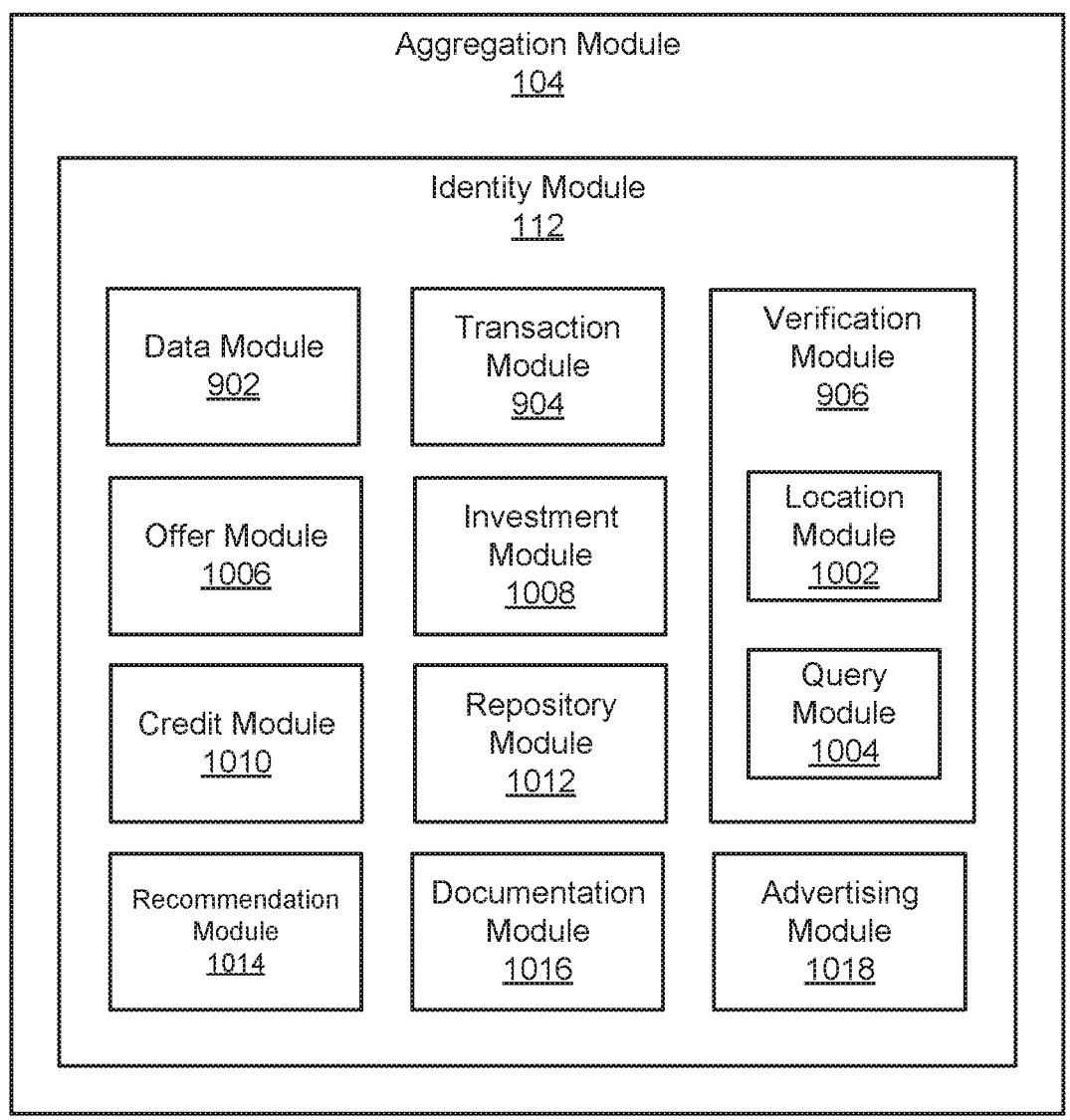
FIG. 10 is a schematic block diagram of another embodiment of an aggregation module.

FIG. 10 depicts one embodiment of an aggregation module 104 that includes an instance of an identity module 112 for mobile device based identity verification. In one embodiment, the identity module 112 includes one or more of a data module 902, a transaction module 904, and a verification module 906, which may be substantially similar to the data module 902, the transaction module 904, and the verification module 906 described above. In further embodiments, the verification module 906 includes one or more of a location module 1002 and a query module 1004. The identity module 112, in certain embodiments, further includes one or more of an offer module 1006, an investment module 1008, a credit module 1010, a repository module 1012, a recommendation module 1014, a documentation module 1016, and an advertising module 1018, which are described in more detail below.

The location module 1002, in one embodiment, is configured to verify the identity of the user by determining that the sensor data comprises a geographic location (e.g., a GPS location, a latitude/longitude coordinate, an address, or the like) for the user that corresponds to a geographic location of the transaction. In such an embodiment, the location module 1002 may compare, cross-reference, or the like location data from the sensor data that the data module 902 receives with location data for a transaction that the transaction module 1004 receives.

For instance, while a transaction is being performed (e.g., after a card is swiped to purchase a product at a merchant, but before the transaction is finalized or completed), the location module 1002 may determine a user that is associated with the transaction (e.g., using a user identifier or name from the credit card) and may receive real-time location information from sensors associated with the user's hardware device 102 (the user identifier may be associated with an online account, like a data aggregation account, that has access to the user's hardware device 102 using a device identifier such as an IP address, a MAC address, a cellular identifier, and/or the like). The location module 1002 may compare the received location information with a location for the transaction being performed to determine whether the locations match (e.g., exactly or within a predefined distance of each other). If so, then the location module 1002 concludes that the user is at the location where the transaction is being performed and the transaction is allowed; otherwise, the location module 1002 concludes that the user is at a different location than where the transaction is being performed, implying the user's credentials, credit card, or the like has been misappropriated and is being used without the user's authorization, and the transaction is denied.

In certain embodiments, the location module 1002 verifies the identity of the user by determining that the geographic location for the transaction is within a threshold distance of a known location in the sensor data. For instance, the location module 1002 may identify different known or commonly used locations from the user's sensor data such as the user's home, the user's workplace, the user's school, the user's commonly visited restaurants or other places of interest, and/or the like. Based on this information, the location module 1002 may determine whether the user was present during the transaction as indicated by whether the geographic location of the transaction is within a threshold distance of a known location. A known location, as used herein, may refer to a geographic location that the user has visited a threshold number of times within a predetermined period of time. For example, the user's home may be a known location because the user is regularly, if not daily, at the home as indicated by the location sensors on the user's hardware device 102. In another example, if a user regularly visited a fast-food restaurant once a week for the past six months, then the fast-food restaurant may be a known location, whereas if a user has visited a gas station twice in the past year (e.g., while on vacation), then the gas station may not be a known location.

In one embodiment, the location module 1002 may use historical sensor data and historical transaction data to perform conflict or dispute resolution for one or more transactions. For example, a user may dispute one or more transactions that appear on the user's credit card statement. In response to the dispute notice, the location module 1002 may take sensor data for the same time frame (e.g., day, time, or the like) as the one or more transactions and compare the geographic locations of the user's hardware device (from the sensor data) with the geographic locations of the one or more transactions for the same time frame to verify the user was present at the geographic locations of the one or more transactions. If not, then the location module 1002 may conclude that the user did not perform the transactions in dispute.

In one embodiment, the location module 1002 verifies the identity of the user in response to determining that the user provided authentication information for the transaction at the geographic location for the transaction. The authentication information may include biometric information (e.g., fingerprint, retinal scan, voice sample, or the like), electronic credentials (e.g., username and password, PIN, passphrase, keyword, verification code, or the like), a card swipe, a chip read (e.g., a chip of a credit card), an NFC transmission from the user's smart phone, and/or the like. For example, when the user provides authentication information, e.g., a PIN or username/password, the authentication information may be sent to the data module 902 as part of the sensor data. The authentication information may also be part of the transaction metadata that the transaction module 904 receives. Accordingly, the location module 1002 may verify that the authentication information that is provided at a geographic location of a transaction corresponds to authentication information in the sensor data for the same geographic location and the same time frame of the transaction. In this manner, even if the user is within a similar geographic location as the transaction, the location module 1002 further verifies that it was the user that entered the authentication information and not an unauthorized user.

In one embodiment, the query module 1004 is configured to verify the identity of the user by prompting the user to provide a response to a security question (e.g., presented as part of a banking or financial program) that is created based on the sensor data and confirming that the user's response corresponds to the sensor data that the security question is based on. For example, the query module 1004 may use the sensor data to determine the three most recently used applications that the user used on the user's hardware device; to determine the user's location at noon; to determine the person that the user most recently called; to display different images and have the user select the image that corresponds to the wallpaper on their device 102; to select a map of the user's run that morning, from a plurality of different maps, as tracked by the user's hardware device 102; and/or the like. In other words, the security question is based on various information that the sensor data contains and that the user should be the only person that would know the answer to the security question.

In one embodiment, if the query module 1004 presents the security question during a transaction to confirm completion, finalizing, or processing the transaction. For example, during a transaction at a merchant, the query module 1004 may send the security question to the user's hardware device 102 to verify the transaction in response to the user correctly providing a response to the security question. If the answer is correctly provided, then the transaction may be processed; otherwise the transaction may be denied.

In such an embodiment, the query module 1004 may determine whether the user exited the application that the security question is presented in; executed or opened a different application; installed, or has installed, an application or service that can be used to answer the security question; or the like. For example, if a security question is presented and the query module 1004 detects that the user returned to the home screen for a device 102; checked an application install/delete history for the device 102; opened a web browser or social media application on the device 102; checked a calendar, call history, text message application, or the like on the device 102; and/or the like, the query module 1004 may assume that the user is trying to find the answer to the security question (which should be easy for the actual user to know from memory). If so, then the query module 1004 may determine that the transaction is fraudulent, or that the transaction is being made by an unauthorized user, and may deny or reject the transaction.

In one embodiment, the query module 1004 is further configured to communicate with, access an API of, or the like a password manager executing on the user's device 102 in response to receiving a correct response to the security question. As used herein, a password manager may refer to an application for generating, storing, and/or encrypting passwords that are accessible using a master password. In such an embodiment, the query module 1004 may be used as an additional layer of security or verification for accessing the user's online accounts (e.g., a bank account, a social media account, or the like). In an example embodiment, the user may attempt to login to their bank account at a financial institution (e.g., by providing the user's username). In response to detecting the attempted login, the query module 1004 may present a security question, which may be generated based on sensor data from the user's device 102. If the query module 1004 receives the correct response to the security question, the query module 1004 may interface with the password manager executing on the user's device 102 to access the user's password for the financial institution and automatically login to the user's bank account without requiring the user to enter their password.

In one embodiment, the query module 1004 is configured to present a security question on the user's device 102 in response to suspecting or detecting that a transaction is fraudulent (e.g., if the transaction is from an unknown location or at a merchant that the user has not shopped at in the past); if a hardware device 102 is stolen; in response to a fraud check from a financial institution; and/or in response to another authentication event to verify that the user was present or was the user that performed the transaction. In such an embodiment, the security question may be related to sensor data associated with the transaction such as "where were you an hour ago," (e.g., at the time of the transaction), "when was your last purchase," "how did you make your last purchase," "have you ever been to X merchant within the last 24 hours," and/or the like.

In one embodiment, the offer module 1006 is configured to provide the sensor data associated with one or more transactions to a third-party service provider 108, such as a bank, a merchant, a mortgage broker, or the like to receive an offer, promotion, discount, coupon, or the like. For instance, the offer module 1006 may provide biometric data, accelerometer data, location data, purchasing data, and/or the like (e.g., health data such as steps, heart rate, time sitting and/or standing, distance walked and/or ran, other fitness activities, sleep information, caloric intake, and/or other health or fitness data; driving information such as maximum speed, minimum speed, average speed, breaking distance, turning gravitational force, and/or other automobile driving information; financial information from electronic, mobile, and/or wireless payments, from transaction data or other financial information downloaded and/or aggregated by an aggregation module 104, and/or other transaction and/or financial information; and/or other data accessible to the identity module 112) to a third-party service provider 108.

The third-party service provider 108 may provide a targeted advertisement, offer, promotion, or the like for a discounted rate on a mortgage loan refinance, a lower monthly payment on a car loan, a coupon for items at a merchant (e.g., new running shoes based on biometric/health data), and/or the like based on the sensor data. In certain embodiments, the offer module 1006 prompts a user to confirm that the user wants to share their sensor data with a particular third-party service provider 108, with a plurality of third-party service providers 108, with no third-party service provider 108, or the like.

In one embodiment, the investment module 1008 is configured to automatically invest in one or more investments for a user based on the user's sensor data. For instance, if the investment module 1008 determines that the user's sensor and/or transaction data indicates that the user exercises regularly, makes purchases at sporting goods stores regularly, regularly purchases exercising equipment online (e.g., based on SKU-level data), and/or the like, the investment module 1008 may invest in exercise-related products and services.

In some embodiments, the investment module 1008 is configured to recommend, suggest, or the like different investments, different investment products, different companies to invest in, or the like to the user. The investment module 1008 may then receive one or more investment selections from the user, including an amount, percentage, or the like to invest in each investment.

In one embodiment, the credit module 1010 is configured to provide to one or more third-party service providers 108 histories associated with the user and determined based on the sensor data and/or the transaction data. For example, the credit module 1010 may provide data to a credit bureau that indicates a length of time that a user has had one or more social media accounts, business accounts, email accounts, financial accounts, and/or other online accounts; how often a user exercises; places that the user often visits; how much money is in a user's bank account at any given time or between pay periods; and/or the like. Based on the historical data, a credit bureau or other third-party service provider 108 may gain a more complete picture of the user's life, lifestyle, spending habits, subscription habits, exercising habits, web browsing habits, sleeping habits, and/or the like to generate a more accurate credit score, report, worthiness analysis, and/or the like.

In one embodiment, the repository module 1012 is configured to maintain a local credit and/or value repository, e.g., at an aggregation server, which may be used for various purchases such as in-app purchases, mobile wallet purchases, and/or other electronic purchases. In such an embodiment, the repository module 1012 may have access to the user's bank account(s) to deposit money from the repository into the account and/or withdraw money from the account to the repository.

The repository module 1012 may monitor the user's transaction data to add value to the repository, from the user's bank account(s), based on the transaction data. For instance, the repository module 1012 may round a transaction to the nearest dollar and deposit the difference between the rounded amount and the actual transaction amount in the repository from the user's bank account(s). The repository module 1012 may use the value (money) in the repository to cover transaction fees, overdraft fees, and/or other fees associated with various transactions.

In one embodiment, the repository module 1012 may cover the cost or amount of a transaction while delaying payment of the transaction and grouping the transaction with other transactions in order to avoid transaction fees (e.g., on a transaction-by-transaction basis, daily, weekly, monthly, or the like) by reducing the total number of transactions. In some embodiments, the repository module 1012 may provide third-party service providers 108 to add value to the repository in response to the user performing one or more actions such as making a purchase at the third-party service provider 108, sharing a link, posting content on social media, installing an application, and/or the like.

In some embodiments, the repository module 1012 maintains a repository like a database, a data store, a data structure, a list, a table, and/or the like of user identification information as provided by the user, as received from the user's hardware device 102, as received from the user's transaction data, and/or the like. In one embodiment, the repository module 1012 securely stores the user's identification information by encrypting the information, password protecting the information, and/or the like based on sensor data.

For example, in certain embodiments, the repository module 1012 may provide an interface for a user to provide certain identity information (e.g., name, address, telephone number, email address, social security number, drivers' license number, birthdate, gender, financial information, employment history, income data, personal reference contact information, residential address history, security question answers, mother's maiden name, city of birth, schools attended and/or years attended, spouse's name, dependent's names, or the like), which the repository module 1012 may provide to a third-party service provider 108 (e.g., in order to open a new account for the user, apply for a loan, increase a credit limit, or the like for the user) in response to authorization from the user.

In this manner, in one embodiment, the repository module 1012 may simplify an application or startup process for a user with one or more third-party service providers 108, providing a third-party service provider 108 with a completed application nearly instantly (e.g., over the data network 106; using a wireless communications protocol such as Bluetooth®, near field communication (NFC), or the like; and/or using another electrical and/or digital communications channel), rather than requiring the user to manually fill out an application and gather the information in a process that may take hours or days, and may require further verification by the third-party service provider 108.

The repository module 1012 may require verification and/or authentication from a user (e.g., electronic credentials such as username and password, fingerprint scan, retinal scan, digital certificate, PIN, challenge response, security token, hardware token, software token, DNA sequence, signature, facial recognition, voice pattern recognition, bioelectric signals, two-factor authentication credentials, or the like) prior to providing information to a third-party service provider 108 (e.g., using hardware and/or a sensor of the user's hardware device 102, or the like). The repository module 1012, in certain embodiments, may monitor, store, and/or track certain sensor information (e.g., location data from a GPS sensor, a history of valid and/or invalid authentication or other identity verification events of a user, application install or usage history, mobile wallet or other electronic payment information, health information such as steps and/or heartrate data, and/or other information), with the user's permission, in order to verify and/or authenticate the user at a later time, or the like (e.g., to verify the user's identity as described above in addition to the sensor and transaction data).

In one embodiment, the recommendation module 1014 is configured to provide suggestions, recommendations, advice, or the like based on sensor data, transaction data, and/or the like. For instance, the recommendation module 1014 may recommend one or more restaurants to the user based on previous restaurants that the user has eaten at (as indicated by the transaction data) and based on the user's level of health (as determined based on biometric sensor data). Other recommendations may include purchase recommendations, suggestions for places to shop, movie suggestions, suggestions for times to go to sleep/wake up, suggestions for different exercises and/or places to exercise, and/or the like.

In one embodiment, the documentation module 1016 is configured to provide financial documentation, identification documentation, tax documentation, employee documentation, business documentation, government documentation, and/or the like to one or more third-party service providers 108 for tax purposes, investment purposes, identification purposes, and/or the like. For example, the documentation module 1016 may send the user's insurance card to a police officer in response to the sensor data indicating that the user or the user's car has been pulled over, was in an accident, and/or the like. In further embodiments, the documentation module 1016 may automatically send a travel notification to a third-party service provider 108 such as a bank in response to detecting that the user in on vacation as indicated by location data in the sensor data.

Figure 11:
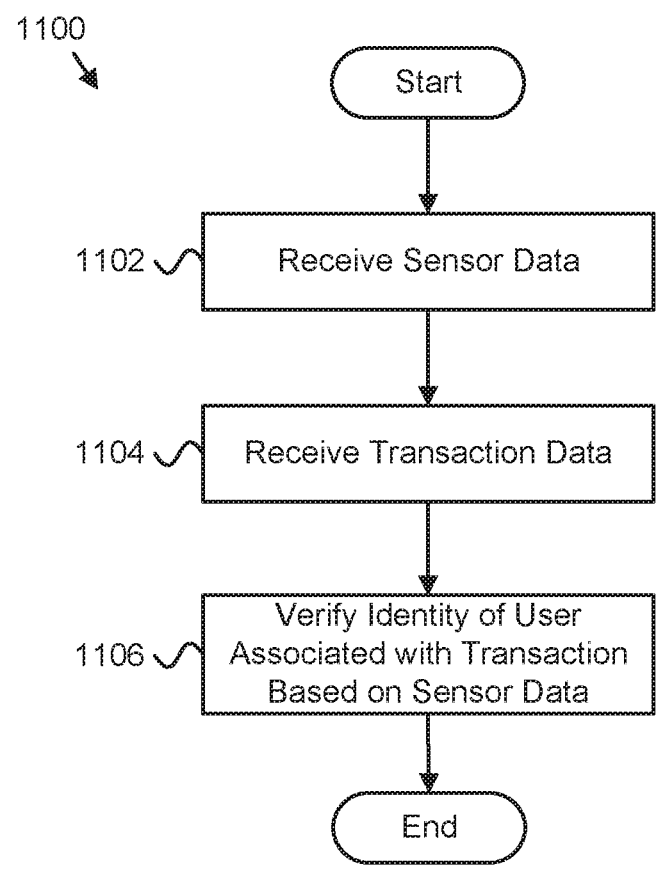
FIG. 11 is a schematic flow chart diagram illustrating one embodiment of a method for mobile device based identity verification.

FIG. 11 is a schematic flow-chart diagram illustrating one embodiment of a method 1100 for mobile device based identity verification. In one embodiment, the method 1100 begins and the data module 902 receives 1102 sensor data from a hardware device 102 associated with a user. In certain embodiments, the transaction module 904 receives 1104 transaction data associated with a transaction. In one embodiment, the verification module 906 verifies 1106 an identity of a user making the transaction based on the received sensor data. The transaction may be allowed in response to verifying the user's identity, and the method 1100 ends.

Figure 12:
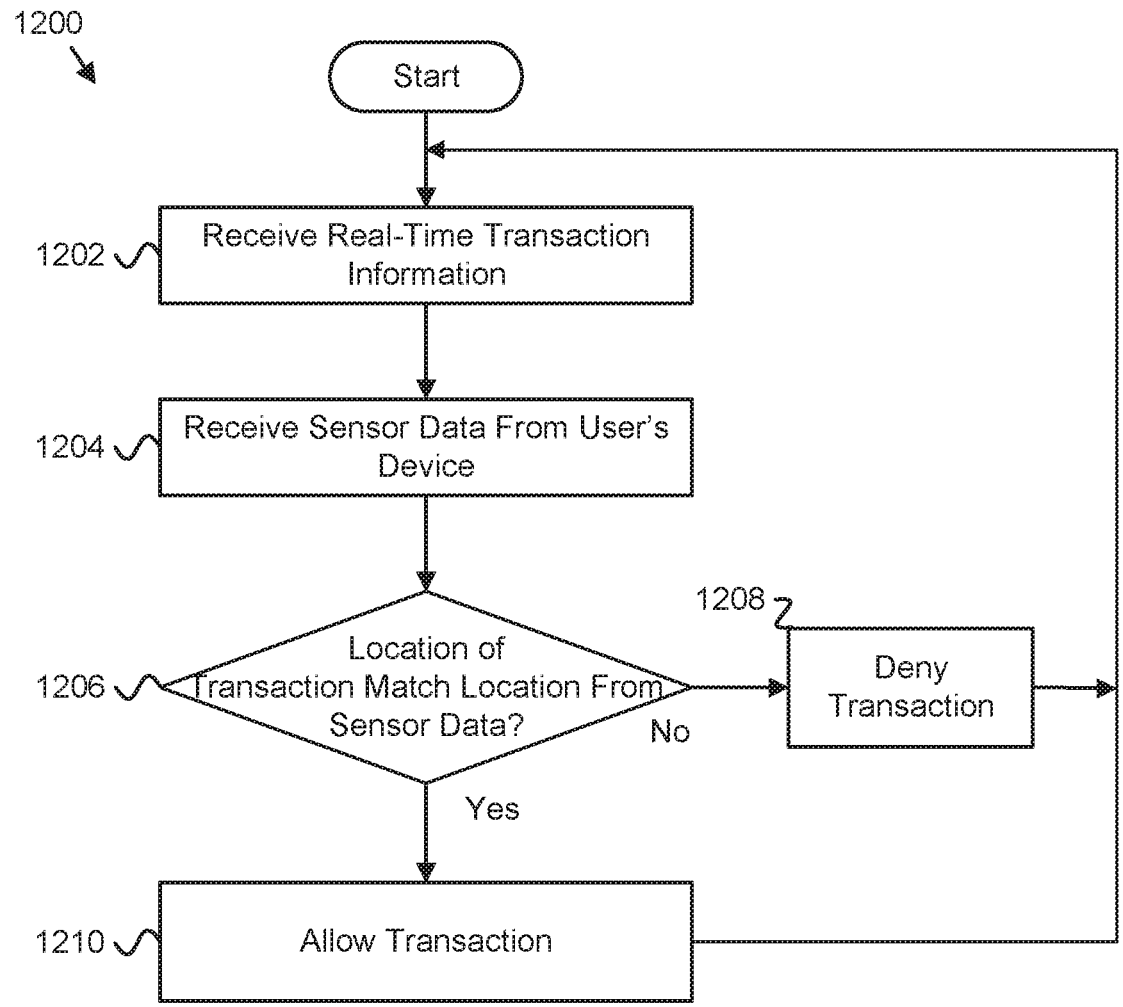
FIG. 12 is a schematic flow chart diagram illustrating a further embodiment of a method for mobile device based identity verification.

FIG. 12 is a schematic flow-chart diagram illustrating one embodiment of a method 1200 for mobile device based identity verification. In one embodiment, the method 1200 begins and the transaction module 904 receives 1202 real-time transaction data for an ongoing or in-process transaction. The data module 902, in one embodiment, receives 1204 sensor data from the user's device 102 in response to the real-time transaction data. The transaction data may include a geographic location for the transaction, and the sensor data may include a geographic location for the user's device 102.

In one embodiment, the location module 1002 determines 1206 whether the location of the transaction matches (e.g., is exact, is within a threshold distance of, or the like) the location of the user's device 102 from the sensor data. If so, the verification module 906 allows 1210 the transaction to be processed; if not, the verification module 906 denies 1208 the transaction because the user's location does not match the transaction location indicating an unauthorized transaction. The transaction module 904 continues to monitor and receive 1202 transaction data in real-time for ongoing or in-process transactions.

Figure 13:
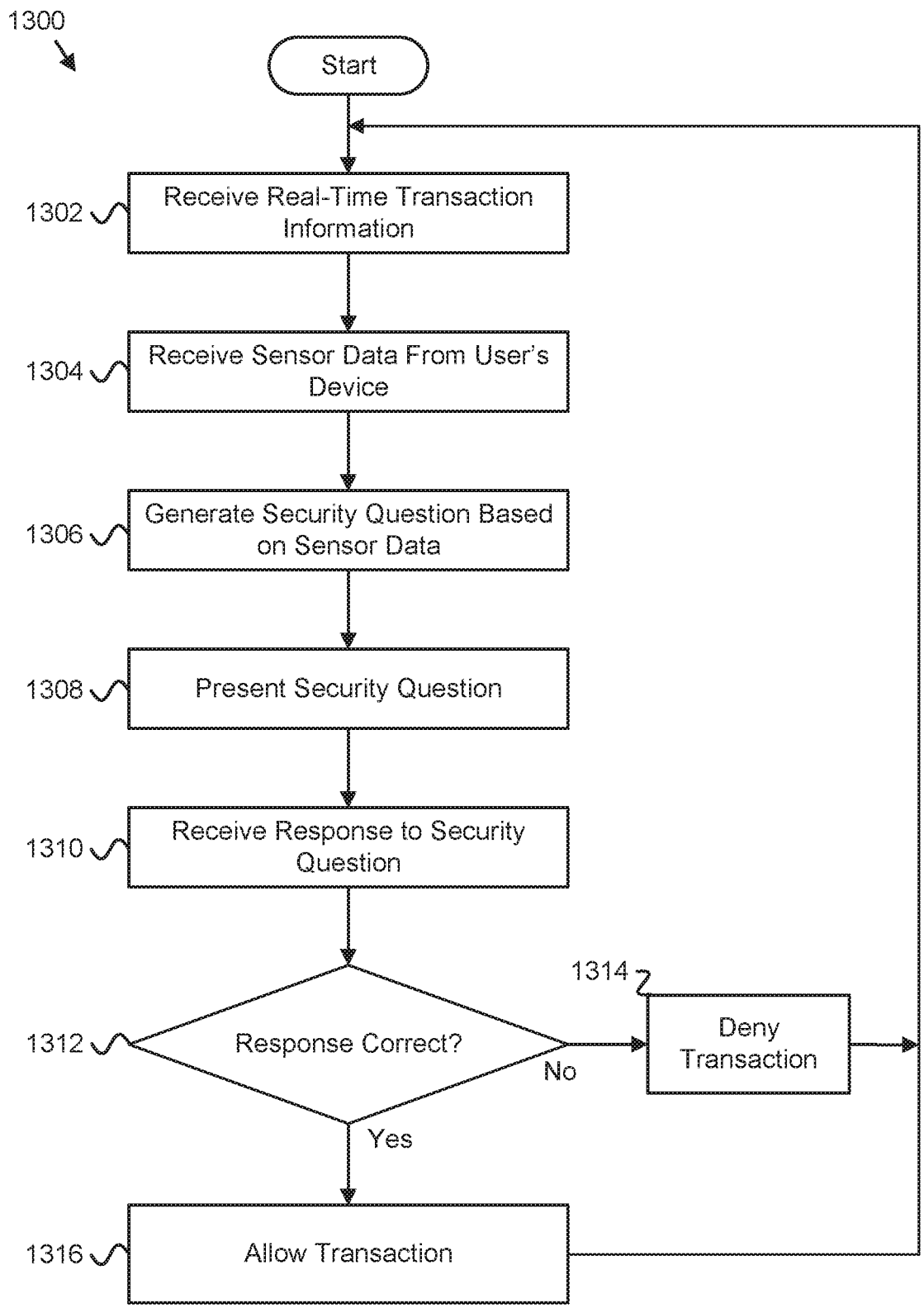
FIG. 13 is a schematic flow chart diagram illustrating another embodiment of a method for mobile device based identity verification.

FIG. 13 is a schematic flow-chart diagram illustrating one embodiment of a method 1300 for mobile device based identity verification. In one embodiment, the method 1300 begins and the transaction module 904 receives 1302 real-time transaction data for an ongoing or in-process transaction. The data module 902, in one embodiment, receives 1304 sensor data from the user's device 102 in response to the real-time transaction data. The transaction data may include a geographic location for the transaction, and the sensor data may include a geographic location for the user's device 102.

In one embodiment, the query module 1004 generates 1306 a security question based on the sensor data. In further embodiments, the query module 1004 presents 1308 the security question and receives 1310 a response to the security question. The query module 1004 determines 1312 whether the response is correct, based on the sensor data. If so, the verification module 906 allows 1316 the transaction to be processed; if not, the verification module 906 denies 1314 the transaction because the user's response, which the user should know, does not match the correct response. The transaction module 904 continues to monitor and receive 1302 transaction data in real-time for ongoing or in-process transactions.

A means for determining a user's electronic credentials for a third-party service provider 108 on a hardware device 102 of the user, in various embodiments, may include one or more of a hardware device 102, a backend server 110, an authentication module 202, a local authentication module 302, a network authentication module 304, a password manager module 306, an aggregation module 104, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for determining a user's electronic credentials for a third-party service provider 108 on a hardware device 102 of the user.

A means for accessing a server 108 of a third-party service provider 108, from a hardware device 102 of a user, using the user's electronic credentials, in various embodiments, may include one or more of a hardware device 102, a backend server 110, a direct access module 204, a pattern module 308, an access repair module 310, a hierarchy module 312, an aggregation module 104, a network interface, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for accessing a server 108 of a third-party service provider 108, from a hardware device 102 of a user, using the user's electronic credentials.

A means for downloading data associated with a user from a server 108 of a third-party service provider 108 to a hardware device 102 of the user, in various embodiments, may include one or more of a hardware device 102, a backend server 110, a direct access module 204, a pattern module 308, an access repair module 310, a hierarchy module 312, an aggregation module 104, a network interface, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for downloading data associated with a user from a server 108 of a third-party service provider 108 to a hardware device 102 of the user.

A means for packaging downloaded data from a hardware device 102 of a user for a remote device 110, 102 unaffiliated with a third-party service provider 108 from which the data was downloaded, in various embodiments, may include one or more of a hardware device 102, a backend server 110, an interface module 206, an aggregation module 104, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for packaging downloaded data from a hardware device 102 of a user for a remote device 110, 102 unaffiliated with a third-party service provider 108 from which the data was downloaded.

A means for providing downloaded data from a hardware device 102 of a user to a remote device 110, 102 unaffiliated with a third-party service provider 108 from which the data was downloaded, in various embodiments, may include one or more of a hardware device 102, a backend server 110, an interface module 206, an aggregation module 104, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for providing downloaded data from a hardware device 102 of a user to a remote device 110, 102 unaffiliated with a third-party service provider 108 from which the data was downloaded.

A means for receiving sensor data from a hardware device associated with a user, in various embodiments, may include one or more of a hardware device 102, a backend server 110, a data module 902, an identity module 112, an aggregation module 104, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for receiving sensor data from a hardware device associated with a user.

A means for receiving means for receiving transaction data associated with a transaction, in various embodiments, may include one or more of a hardware device 102, a backend server 110, a transaction module 904, an identity module 112, an aggregation module 104, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for receiving transaction data associated with a transaction.

A means for receiving means for verifying an identity of a user making the transaction based on the received sensor data, in various embodiments, may include one or more of a hardware device 102, a backend server 110, a verification module 906, an identity module 112, an aggregation module 104, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for verifying an identity of a user making the transaction based on the received sensor data.

Means for performing the other method steps described herein, in various embodiments, may include one or more of a hardware device 102, a backend server 110, an authentication module 202, a local authentication module 302, a network authentication module 304, a password manager module 306, a direct access module 204, a pattern module 308, an access repair module 310, a hierarchy module 312, an interface module 206, a route module 314, a frequency module 316, a test module 318, an aggregation module 104, a network interface, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for performing one or more of the method steps described herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   one or more sensors;
   a processor; and
   a memory coupled to the processor, the memory storing instructions executable by the processor to cause the apparatus to:
   receive sensor data from the one or more sensors, the sensor data comprising information describing an historical usage by a user of one or more applications that are executable on the hardware device;
   receive transaction data associated with a transaction of the user from a third-party source, the transaction comprising a purchase by the user; and
   verify an identity of the user based on the sensor data by:
   generating a security question based on the information describing the historical usage of the one or mom;
   presenting the security question;
   receiving a response by the user to the security question; and
   determining whether the response corresponds to the sensor data;
   detect whether the user opened a different application;
   allow the transaction in response to determining that the response corresponds to the sensor data and detecting that the user did not open a different application; and
   reject the transaction in response to at least one of the response not corresponding to the sensor data and detecting that the user opened a different application.

2. The apparatus of claim 1, wherein the instructions are executable by the processor to cause the apparatus to:
   access one or more passwords stored by a third-party password manager in response to determining that the response corresponds to the sensor data; and
   login to one or more online accounts of the user associated with the one or more passwords.

3. The apparatus of claim 1, wherein the instructions are executable by the processor to cause the apparatus to verify the identity of the user during an ongoing transaction by prompting the user for the response to the security question to complete the transaction.

4. The apparatus of claim 1, the instructions are executable by the processor to cause the apparatus to provide at least a portion of the sensor data to a third-party service provider.

5. The apparatus of claim 1, wherein the transaction data comprises historical transaction data that is aggregated from a plurality of third-party data sources and the sensor data comprises historical sensor data corresponding to the historical transaction data.

6. The apparatus of claim 1, wherein the transaction data comprises real-time transaction data for the transaction in process and the sensor data comprises sensor data corresponding to the real-time transaction data.

7. A method, comprising:
   receiving, by a hardware device, sensor data from one or more sensors of the hardware device, the sensor data comprising information describing an historical usage by a user of one or more applications that are executable on the hardware device;
   receiving, by the hardware device, transaction data associated with a transaction of the user from a third-party source, the transaction comprising a purchase by the user;
   verifying, by the hardware device, an identity of a user based on the sensor data by:
   generating, by the hardware device, a security question based on the information describing the historical usage;
   presenting the security question;
   receiving a response by the user to the security question; and
   determining whether the response corresponds to the sensor data;
   detecting, by the hardware device, whether the user opened a different application;

allowing, by the hardware device, the transaction in response to determining that the user's response corresponds to the sensor data and detecting that the user did not open a different application; and rejecting, by the hardware device, the transaction in response to at least one of the response not corresponding to the sensor data and detecting that the user opened a different application.

8. The method of claim 7, wherein the transaction is rejected in response to detecting that the user used an application determining the response to the presented security question prior to providing the response.

9. The method of claim 7, further comprising:

accessing one or more passwords stored by a third-party password manager in response to determining that the response corresponds to the sensor data; and logging in to one or more online accounts of the user associated with the one or more passwords.

10. The method of claim 7, further comprising:

verifying the identity of the user during an ongoing transaction by prompting the user for the response to the security question to complete the transaction.

11. A non-transitory computer readable media storing instructions that when executable by a processor of a hardware device causes the processor to perform the steps of:

receiving sensor data from one or more sensors of the hardware device, the sensor data comprising information describing an historical usage by a user of one or more applications that are executable on the hardware device;

receiving transaction data associated with a transaction of the user from a third-party source, the transaction comprising a purchase by the user; verifying an identity of a user based on the sensor data by:

generating, by the hardware device, a security question based on the information describing the historical usage;

presenting the security question;

receiving a response by the user to the security question; and determining whether the response corresponds to the sensor data;

detecting whether the user opened a different application;

allowing the transaction in response to determining that the response corresponds to the sensor data and detecting that the user did not open a different application; and rejecting the transaction in response to at least one of the response not corresponding to the sensor data and detecting that the user opened a different application.

\* \* \* \* \*